(12) United States Patent
Bolene et al.

(10) Patent No.: US 9,237,056 B2
(45) Date of Patent: *Jan. 12, 2016

(54) SERVICE ASSEMBLY ARCHITECTURE

(75) Inventors: David William Bolene, Austin, TX (US); David Elliott Parkhill, Louisville, CO (US); Francis Joseph Glynn, Boulder, CO (US)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 1780 days.

This patent is subject to a terminal disclaimer.

(21) Appl. No.: 11/783,431

(22) Filed: Apr. 9, 2007

(65) Prior Publication Data

US 2008/0247421 A1 Oct. 9, 2008

(51) Int. Cl.
H04L 29/06 (2006.01)
H04L 29/08 (2006.01)
G06F 9/50 (2006.01)
H04L 12/58 (2006.01)
H04Q 3/00 (2006.01)

(52) U.S. Cl.
CPC ........ *H04L 29/06326* (2013.01); *G06F 9/5038* (2013.01); *H04L 12/5835* (2013.01); *H04L 29/0619* (2013.01); *H04L 29/06176* (2013.01); *H04L 29/06319* (2013.01); *H04L 29/06537* (2013.01); *H04L 29/08576* (2013.01); *H04L 51/066* (2013.01); *H04L 67/14* (2013.01); *H04Q 3/0054* (2013.01); *H04Q 2213/1305* (2013.01); *H04Q 2213/1313* (2013.01); *H04Q 2213/13034* (2013.01); *H04Q 2213/13098* (2013.01); *H04Q 2213/13274* (2013.01); *H04Q 2213/13336* (2013.01); *H04Q 2213/13389* (2013.01)

(58) Field of Classification Search
None
See application file for complete search history.

(56) References Cited

U.S. PATENT DOCUMENTS

| 6,804,199 | B1 * | 10/2004 | Kelly et al. ................... 370/238 |
| 7,593,321 | B2 * | 9/2009 | Galand et al. ................. 370/218 |
| 7,882,209 | B1 * | 2/2011 | Eslambolchi et al. ........ 709/223 |
| 2002/0194147 | A1 * | 12/2002 | Ricke .............................. 706/53 |
| 2004/0024858 | A1 * | 2/2004 | Garcelon et al. ............. 709/223 |
| 2006/0066717 | A1 | 3/2006 | Miceli |
| 2006/0167714 | A1 * | 7/2006 | Birch et al. ....................... 705/1 |
| 2007/0124585 | A1 * | 5/2007 | Feather et al. ................ 713/168 |

(Continued)

FOREIGN PATENT DOCUMENTS

WO 2004/027548 A 4/2004

OTHER PUBLICATIONS

Partial European Search Report dated Feb. 7, 2008 in EP 07 25 3519.

(Continued)

*Primary Examiner* — Ashley Shivers
(74) *Attorney, Agent, or Firm* — Nixon & Vanderhye P.C.

(57) ABSTRACT

A method for effecting communication between devices in a communications network, the method comprising managing a communications process control flow; providing a plurality of re-usable components of the process control flow in which each component comprises a process control activity between two of the devices; aggregating the plurality of re-usable components into a sequence of the communications process control flow; in which each re-usable component is arranged to process a data structure; in which the data structure is the same for each re-usable component of the communications process control flow.

13 Claims, 14 Drawing Sheets

(56) References Cited

U.S. PATENT DOCUMENTS

2008/0250393 A1    10/2008    Bolene et al.
2009/0217299 A1*    8/2009    Belluati et al. ................ 719/318

OTHER PUBLICATIONS

Kavantzas N. et al., "Web Services Choreography Description Language Version 1.0," W3C Working Draft, Dec. 17, 2004, pp. 1-64, XP002468055, http://www.w3.org/TR/2004/WD-ws-cdl-10-20041217/.

Peltz C., "Web Services Orchestration and Choreography," Computer, IEEE Service Center, Los Alamitos, CA, US, vol. 36, No. 10, Oct. 2003, pp. 46-52, XP011102380, ISSN: 0018-9162.

Rosenberg et al., "SIP: Session Initiation Protocol", http://tools.jetf.org/html/rfc3261 Jun. 2002.

Vaha-Sipila, "URLs for Telephone Calls", RFC 2806, http://tools.ietf.org/html/rvc2806, Apr. 2000.

Milner et al., "Pi-calculus", Wikipedia, pp. 1-11, http://en.wikipedia.org/wiki/Pi-calculus.

"Session Initiation Protocol", pp. 1-6, Wikipedia, http://en.wikipedia.org.wiki/Session_Initiation_Protocol.

"Session Initiation Protocol (Java)", Wikipedia, pp. 1-2, http://en.wikipedia.org/wiki/Session_Initiation_Protocol_%28Java%29 pp. 1-2.

"Business Process Modeling Notation", Wikipedia, pp. 1-7, http://en.wikipdia.org/wiki/BPMN pp. 1-7.

"Business Process Execution Language", Wikipedia, pp. 1-6, http://wikipedia.org/wiki/BPEL , Sep. 2005.

BPEL Primer, Sep. 9, 2005, pp. 1-8.

"Enabling the IP Multimedia Subsystem (IMS) With Java™ Technology" The Power of Java, http://developers.sun.com/learning/java-oneoline/2006/mobility/TS-8-152.pdf , 2006.

The Java Community Process(SM) Program—JSRs: Java Specification Requests—detail J.. pp. 1-8, http://www.jcp.org/en/jsr/detail?id=289 pp. 1-8 , 2007.

O'Reilly, Design Patterns and Business Models for the Next Generation of Software, pp. 1-3, Sep. 30, 2005.

O'Reilly, "Virtual Lab Management", http://www.oreillynet.com/pub/a/oreilly/tim/news/2005/09/30/what-is-web-20.html?page=2 .

O'Reilly, "Blogging and the Wisdom of Crowds", Sep. 30, 2005, http://www.oreillynet.com/pub/a/oreilly/tim/news/2005/09/30/what-is-web-20html?page=3 , pp. 104.

O'Reilly, "End of the Software Release Cycle", Sep. 30, 2005, pp. 1-3, http://www.oreillynet.com/pub/a/oreilly/tim/news/2005/09/30/what-is-web-20.html?page+4.

O'Reilly, Sep. 30, 2005, F5 Protects Your Network, http://www.oreillynet.com/pub/a/oreilly/tim/news/2005/09/30/what-is-web-20.html?page=5 pp. 1-23.

Java™ 2 Platform Enterprise Edition Specification, v1.4, Nov. 24, 2003—Bill Shannon, http://java.sun.com/j2ee-1_4-fr-spec.pdf.

W3C: "Web Services Choreography Description Language Version 1.0", Dec. 7, 2007—Kavantzas et al.

Ubiquity, "Appcelerator SOOF: SOA/Web Services Platform", 2006.

Ubiquity: "SIP Application Server", pp. 1-7, 2007.

Examination Report mailed Feb. 8, 2010 in European Appln. No. 08 736 913.8 (5 pages).

International Preliminary Report on Patentability issued Oct. 13, 2009 in International Appln. No. PCT/GB2008/001242 (9 pages).

U.S. Appl. No. 11/808,259, filed Jun. 7, 2007 and its entire file wrapper (including Notice of Allowance issued Dec. 29, 2011).

* cited by examiner

SERVICE ASSEMBLY ARCHITECTURE

INTRODUCTION

The invention relates to the setting up of new services in communications networks.

BACKGROUND

Service Assembly Architecture (SAA) is based on a set of reusable, atomic, service flow management components. These are characterized by standard interfaces that allow for the components to be assembled in any order to provide a desired overall communications control function. The standard interface is complemented by a standard data structure that provides the input and output to each component. Hence there is a high degree of standardization throughout the SAA. The provided control function is implemented in an associated communications network. The SAA allows the rapid creation of new and converged telecommunications services employing reusable service flow elements of various granularities to construct the service.

The present invention applies these novel techniques and defines new constructs that enable the rapid creation of new converged telecommunications services. The need for this ability in the telecoms industry is more acute than ever, with the convergence of fixed line, mobile and media services all melding into a common industry with common customers.

The rapid design and creation of new services has been a goal of the telecommunications industry for some time, dating at least to the post-divestiture era in the U.S. of the late 1980's. At that time many companies invested heavily in developing "service creation platforms" using conventional switches provided with "service interfaces" that allowed a limited level of call-control to be managed by a separate computer known as an adjunct processor. These efforts were motivated by the desire of a diversity of new companies, primarily the divested Regional Bell Operating Companies (RBOCs) in the US, to differentiate themselves from their siblings and other carriers with new communication services. Up until this point, the only features available for offer were those that were embedded in the traditional telecom switches such as the 5ESS. Creation of a new feature or service required the carriers to make a request of the switch supplier (AT&T, Northern Telecom, Ericsson, et al.) for the new feature, essentially requesting a custom development effort from the switch suppler. The costs and development times associated with such customizations were often very substantial, resulting in multi-million dollar quotations. The costs of building such services were so high that very few were actually built.

During this time however, new features and functionality such as in-network voice mail and E-911 services became feasible through the above noted service platforms and adjunct processors. Though there were some successful initiatives in this era, the associated capital costs and development intervals were still prohibitive for services except those that were expected to be widely adopted. Predicting such adoption was very difficult; even some services that were built directly into the switch were not commercially successful.

SUMMARY

There is a need for the rapid creation of new products, with which early market opportunities can be grasped. There is a need to re-use technology and operational investment. As far as possible, new products or services should re-use the existing portfolio, preferring configuration and assembly to developing from scratch. The benefits of this reusable process control flow approach include: reduced development costs; reduced integration & testing costs; faster time to market for new services and improved ROI.

To address these shortcomings, we propose a system and corresponding method for effecting communication between devices in a communications network, in which the method comprises providing a plurality of re-usable components of a process control flow in which each component comprises a process control activity between two of the devices; aggregating the plurality of re-usable components into a sequence of the communications process control flow; in which each re-usable component is arranged to process a data structure; in which the data structure is the same for each re-usable component of the communications process control flow. The use of re-usable components achieves an assembly effect to make (converged) service creation faster with fewer bugs by building new services from pre-developed parts that implement reusable feature/function.

Furthermore, a suitable re-usable component of a process control flow is proposed, in which the re-usable component includes: receiving from a source a request comprising one or more parameters for communications process control; identifying constraints relating to the communications process and comparing the parameters received with the request with the constraints; checking for a result from the comparison and attempting to set up a connection to an end point identified by one or more of the parameters, if the result is positive; waiting for the result of the connection attempt; upon receiving the result of the connection attempt, assessing the result; and notifying the source of the request of the outcome of the communications process control flow.

BRIEF DESCRIPTION OF THE DRAWINGS

Further features and advantages of the present invention will become apparent from the following detailed description of embodiments thereof, presented by way of example only, and by reference to the accompanying drawings, wherein:—

DETAILED DESCRIPTION OF EMBODIMENTS

Figure 1:
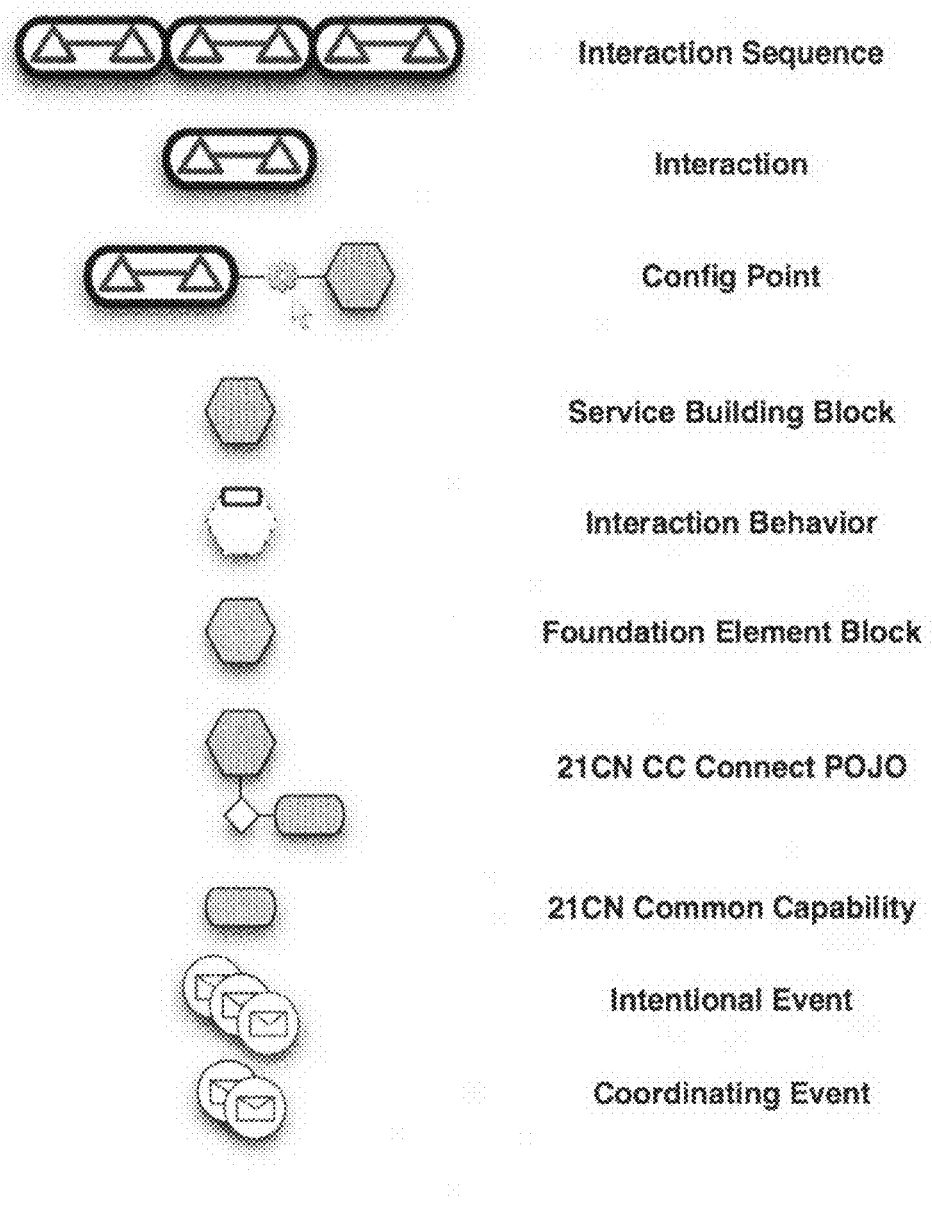
FIG. 1 presents an overview of a design notation used in this specification.

The invention is defined in the claims and will be described here with reference to preferred embodiments.

Main Building Blocks

We shall first describe the main building blocks of the SAA an then proceed to describe how these building blocks can be assembled to create a communication service.

Interaction

An Interaction is a unit of connection coordination between two endpoints in a communications network. An Interaction is a primary service flow consisting of the exchange of control information between two given communication device endpoints. As such, it is capable of receiving from one of the endpoints an input defining a task and of responding to that input by generating appropriate outputs and, as necessary, receiving and processing further inputs from one or other endpoint. As indicated above, the inputs and outputs conform to the standard SAA data format (known as the Cxf context—where Cxf stands for "communications experience framework").

Interaction Behavior

Each interaction itself comprises a standard internal format comprising building blocks known as "Interaction Behaviors". Each Interaction is formed from a small set of all Interaction Behaviors. Each Interaction Behavior has standard interfaces with inputs and outputs conforming to the standard Cxf context data format. Hence the internal structure of each Interaction follows a uniform pattern and reflects the overall standardized nature of the SAA. Having said that, some of the Interaction Behaviors in a particular Interaction may be null or stubs with no active role to play in the operation of that Interaction.

An Interaction Behavior provides a basic step in the control flow processing of the Interaction of which it forms part.

At the level of interaction behaviors, an interaction may take one of two types, referred to as asynchronous and synchronous. In the context of the first, aynchronous type of Interaction, the Interaction Behaviours included in the present invention and their associated functions are as follows:

1. Establish_end_point—populates targetEndpoints with the URIs to connect to.Consider_constraints—examines the targetEndpoints and determines a connect attempt should not be made and records why in connectConstraints.
2. Consider_Constraints examines the targetEndpoints and determines whether a connect attempt should be made or not and records why in connectConstraints
3. Consider_connect—triggers a connect attempt to the URIs listed in targetEndpoint(s). This action is called but it's internal implementation is bypassed if any connectConstraints are present in CxfContext. It calls back to the Interaction asynchronously waiting for the return call back (next step).
4. Wait_for_reply—not implemented with a service building block (see later), just an action in the Interaction's Business Process Execution Language (BPEL) that is asynchronously called back by the Interaction's Consider_connect building block.
5. Consider_result—invokes logging and is where things like pre-pay (eWallet) clearing are initiated
6. Return_result—calls back to the Interaction Sequence.

Figure 2A:
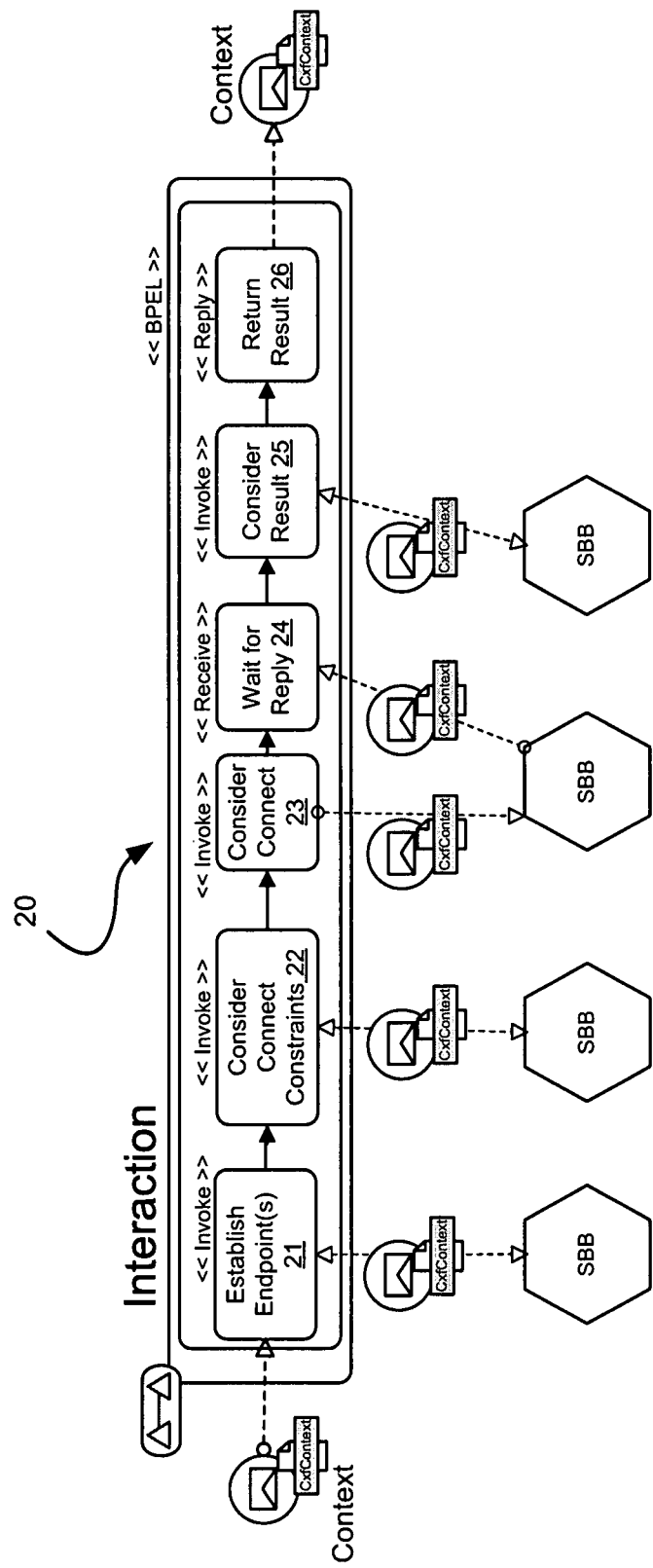
FIGS. 2a and 2b show a schematic for two reusable components according to embodiments of the present invention.

Items 1-6 are characteristic of every Interaction of the first type, although, depending on the context, some will not result in any action being taken besides returning control, as explained in more detail, below. An example of a simple Interaction of the first type is shown in FIG. 2a.

Traditional call management is built using an "event management" loop and a state machine for the main aspect of call handling. According to the traditional call management, as each new event is processed, the state of the call is assessed and progressed to the next eligible state for that call, as dictated by the event. This requires that the state for each call in progress is kept active until the call terminates. This approach can lead to very complex code in which it is very difficult to avoid errors. According to an aspect of the invention, by exploiting Business Process Management (BPM), the state transitions are defined by the interactions and interaction sequences: there is no main event loop; and no process is required to explicitly save or restore its state. The BPM language processor is able to maintain the state of several processes automatically.

The implementation of interactions and interaction sequences takes advantage of the features of the BPM language platform. The "wait_for_reply" construct, characteristic of the asynchronous interaction, exploits such a feature of the Business Process Execution Language (BPEL). BPEL allows for the asynchronous dispatching of a request to another process, allowing the original process to continue performing other work rather than stopping and waiting for reply. In such a case, when the reply to the request arrives, the BPEL platform directs the reply to the correct agent of the process that made the request. This enables conservation of computing resources by allowing the agent that made the request to be put in a quiescent state while the request is outstanding. Hence "wait_for_reply" is differs from the other interaction behaviours in that it is not implemented as a building block but rather as the BPELBPL construct described above.

In the first interaction type, we see the general case for an interaction that behaves asynchronously between the consider_connect behaviour and the wait_for_reply behaviour. However, there are cases where this is not required, such as when a message is being dispatched to an SMS target message dispatch service or a voicemail box. In these cases, the second, synchronous type of interaction is invoked. In the context of the second type of Interaction, the Interaction Behaviours included in the present invention and their associated functions are as follows:

1. Establish_end_point—populates targetEndpoints with the URIs to connect to.Consider_constraints—examines the targetEndpoints and determines a connect attempt should not be made and records why in connectConstraints.
2. Consider_Constraints examines the targetEndpoints and determines whether a connect attempt should be made or not and records why in connectConstraints
7. Synch_connect—synchronously triggers a connect attempt to the URIs listed in targetEndpoint(s). This action is bypassed if any connectConstraints are present in CxfContext
6. Return_result—calls back to the Interaction Sequence.

Figure 2B:
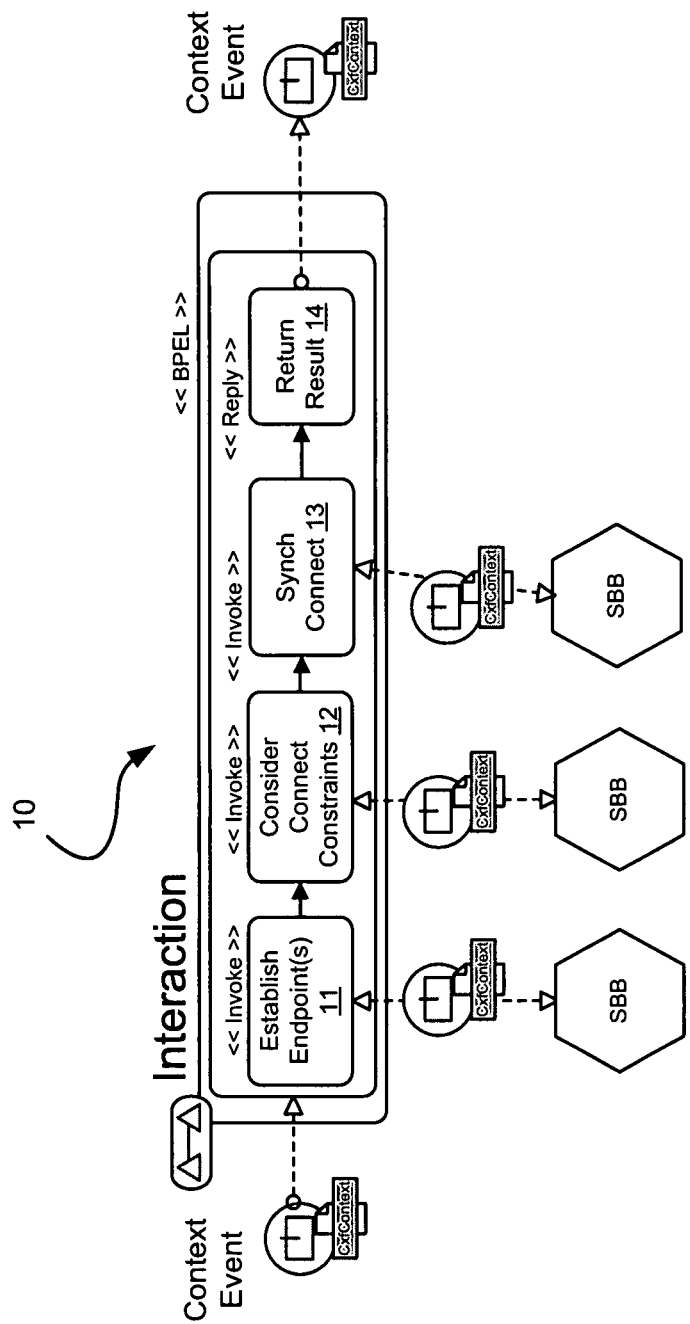

Items 1-2, 7 and 6 are characteristic of every Interaction of the second, synchronous type, although, as with the first type, depending on the context, some will not result in any action being taken apart from returning control, as explained in more detail, below. An example of a simple Interaction of the second type is shown in FIG. 2b.

In the second type of interaction, the synch_connect interaction behaviour replaces the consider_connect and wait_for_reply interaction behaviours present in the first interaction.

In the context of an Interaction Sequence, there is one additional interaction sequence behaviour, as follows:

8. Establish_context—initially creates and populates the CxfContext data structure.

The Establish_context interaction behaviour does not form part of an interaction but is called by the interaction sequence as part of the initial setup before the first interaction of the sequence is invoked (see Interaction Sequence section, below).
Service Building Block (SBB).

The processing step represented by each Interaction Behavior (except set out above in relation to the wait_for_reply behaviour) is implemented through a corresponding building block—a Service Building Block (SBB) which implements the Interaction Behavior. E.g. a Consider_connect SBB, instructs communications network hardware (e.g. a media server) to perform the appropriate task (e.g. collect DTMF digits). There is one-to-one equivalence between each Interaction Behavior and its corresponding SBB. SBBs occupy the application layer in the service assembly architecture. A SBB can be tailored to interface to a particular network element. A number of possible SBBs are illustrated in the Interaction drawings (FIGS. 2a and 2b). For simplicity in the examples set out, later, we shall refer to the Interaction Behavior as the actor in the process flow but it will be understood that each is implemented by a corresponding SBB. A useful way of looking at this relationship is to view the Interaction Behavior as an interface to the associated SBB.

Figure 4:
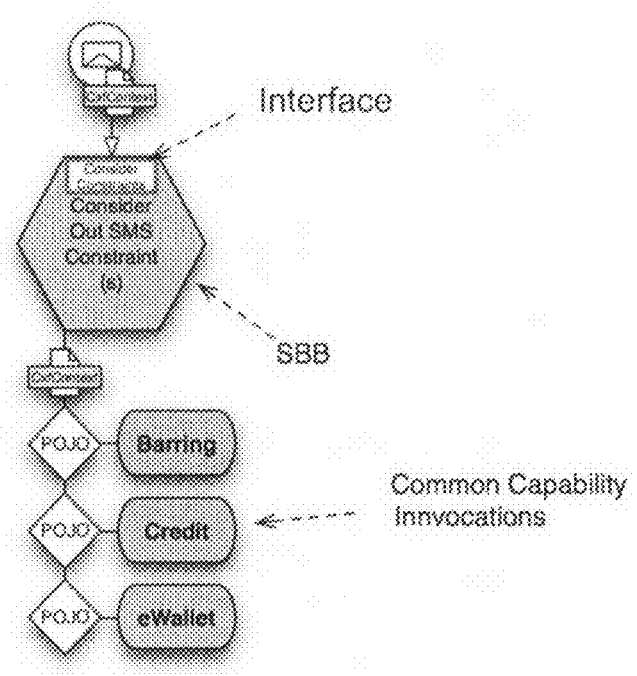
FIG. 4 shows a schematic for reusable sub-components according to embodiments of the present invention.

An example SBB in shown in more detail in FIG. 4. The first thing to notice is that network level services (Common Capabilities) are introduced into the model in a way that the Interaction Sequence, the Interactions, and other SBBs have no knowledge of. Their use is completely encapsulated by the SBB behind the SBB's generic interface. Their effect is recorded in the generic CxfContext data structure and is treated generically and appropriately by other SBBs. In the case of the Consider Constraints SBB of the Figures, a Common Capabilities call may result in another entry in connect-Constraints Map 55 in CxfContext.

Plain old Java objects (POJOs) are used to encapsulate calls to the Common Capabilities. Advantageously, Common Capability POJOs are reusable across different SBBs, and all POJOs implement the same simple interface that simply takes the CxfContext and returns it back to the calling SBB to be passed to the next POJO. This design makes it possible to incrementally add Common Capabilities into the mix in a way that significantly reduces the risk of introducing bugs, once the Interaction flow is working, Common Capabilities can be incrementally introduced quickly as the design evolves. In addition, data configuration is introduced at the binding points from the Interaction to the SBB. This provides for the design placement and runtime passing of XML configuration data that parameterizes the behavior of the SBB at the call point. This approach enables another level of reuse of SBBs across Interactions and supports a fixed set of SBBs that are design-time configured to have the appropriate behavior implementation for the Interactions.

Interaction Sequence

Interactions can be concatenated to form larger communication service components, known as Interaction Sequences. Interaction Sequences are capable of implementing more complex communications process flows. As each Interaction Sequence is comprised of a number of Interactions, it will be understood that each Interaction Sequence enjoys the same, standard interface as the Interactions which make it up. They also share other essential characteristics with Interactions in that all input and output and internal processing is based on the standard Cxf context.

Figure 3:
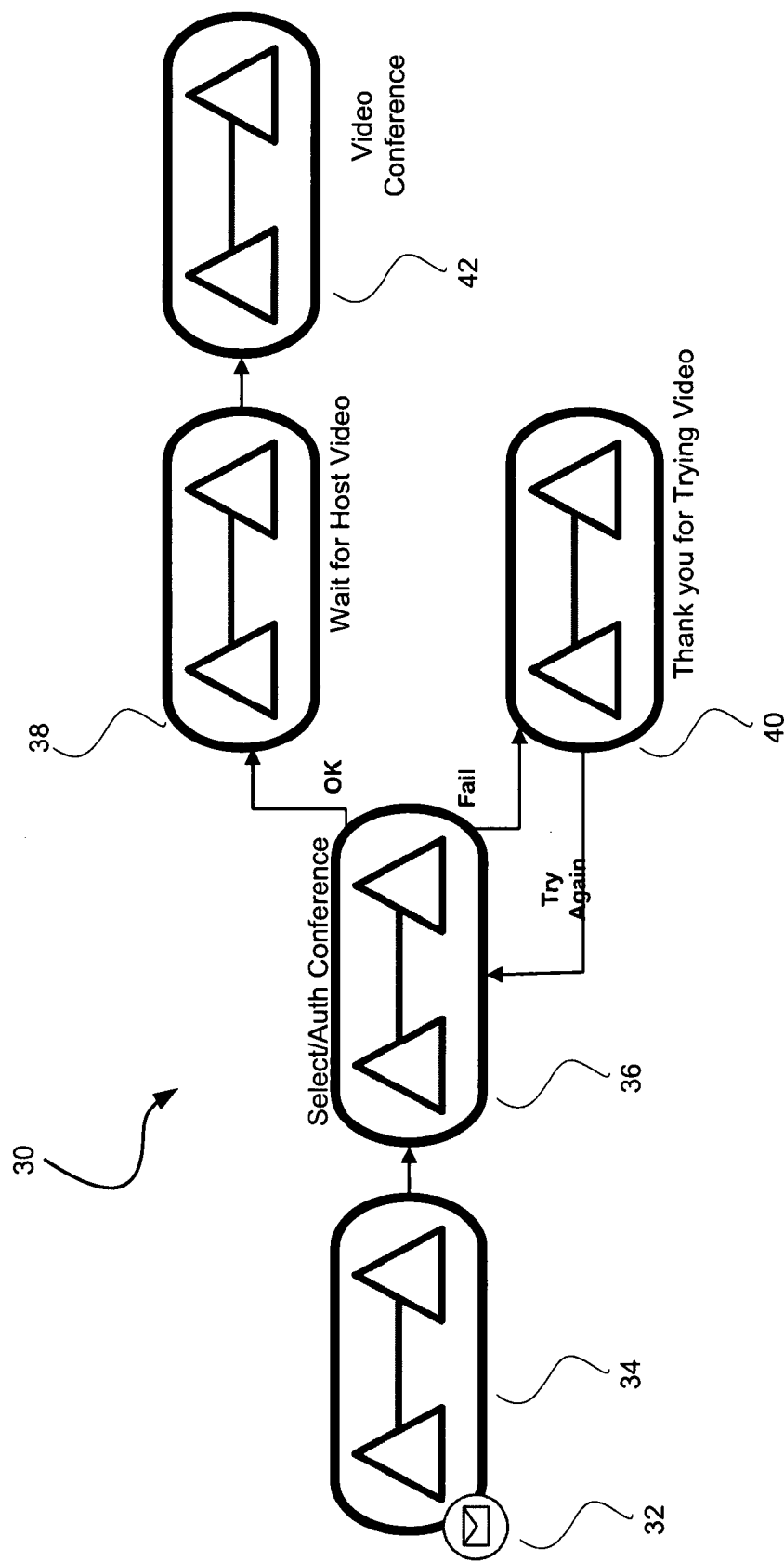
FIG. 3 shows a schematic for a sequence of reusable components according to embodiments of the present invention.

There is a need for the interaction sequence to do some initial setup before the first included interaction is invoked (see FIG. 3). The Establish_context interaction behaviour is called by the Interaction Sequence prior to the call to the first interaction of the interaction sequence. In this manner, the CxfContext data structure is populated for processing by the first interaction of an interaction sequence (See example 1, below): Processing the Cxf Context Data Structure).

Interaction Sequences and their Interaction Behaviors are server side software agents that operate on behalf of endpoints and by extension endpoint users. According to preferred embodiments, these agents are hosted in containers and their control flows are implemented according to process-based techniques underpinned by Business Process Execution Language (BPEL) or XLANG.

The concatenation of Interactions into Interaction Sequences mirrors the way that communication sessions between users in the communications network can be chained together in ways that create a broader experience. An example of a simple Interaction Sequence is shown in FIG. 3. FIG. 3 shows a process to invite a user to join a conference call. The conference may be between two or more users: the actual number is irrelevant to this example which just deals with the interface to a single user (not the chairperson) wishing to join.

The interactions of a sequence can be chained together in the form of directed graphs, with the Interactions as nodes of the graph, enabling branching and looping behavior to be implemented. Interactions execute in a sequential, linear manner with control paths between Interactions modified by results generated in the interaction behaviors. The flow of the interaction sequence will depend on these results and decision testing.

For example, in the "select/auth conference" Interaction of FIG. 3, the output of the "consider result" Interaction Behavior (as shown in FIG. 2a) will depend on the authorization criteria and the control flow from the "select/auth conference" Interaction, will branch to the "OK" path or the "fail" path, accordingly.

To recap, interaction components (Interactions, Interaction Behaviors, Interaction Sequences) initiate activity with network elements and other Interaction Components using Service Building Blocks.

Interaction Components are reusable, in the sense that they can be assembled together to form new services by virtue of their plug compatibility, supported by the standard interface of the Cxf Context.

According to a preferred embodiment, Interaction Component interfaces are based on industry standard Web Services Description Language (WSDL). The effect of this standardized interface is that any Interaction Component can call any other Interaction Component in a polymorphic manner. This means that Interaction Components are pluggable and reusable across different Interaction Sequences.

Cxf Context

Figure 5:
FIG. 5 shows a schematic for a data structure used in embodiments of the present invention.

The Cxf Context is as shown in FIG. 5 and comprises the following nine fields.

OriginalRequest: Contains the originating SIP Invite data, conforming to the SIP Servlet API 1.0. Specify key SIP Invite fields and their prospective values ProductElementID: the name of the service being invoked. The field consists of an ASCII character string with a descriptive name of the service (as defined by the service designer).

userID: the identity of the user invoking the service in Uniform Resource Identifier (URI) (e.g. "sip:bobWilson@aDomain123.com") or a telephone number specific Uniform Resource Locator (URL) format known as TelURL, and as defined by industry standard IETF RFC 2806. URIs in this context are defined by the industry standard SIP Servlet Spec (see IETF RFC 3261). TelURLs are formally defined by IETF RFC 2806. They are essentially phone numbers that accommodate international dialing formats.

targetEndpoints: the identity of the endpoints of the requested service. In practice this could comprise a linked hash map (e.g.: java.util.LinkedHashMap) identifying the endpoints to which connections are to be attempted by the Interaction in the course of the service flow. This element is a data structure of linked pairs of endpoint values of the form [startline URI/TO header URL], where the first value is a key and the second is a value. The startline URI is the next destination in the series of destinations that are involved in a request; the TO header URL is the ultimate intended destination for the invite or request.

The targetEndPoints field can hold multiple target destinations. This is due to the fact that at a SIP signally level, it is possible to dispatch SIP INVITEs to multiple destinations as part of a single SIP transaction. SIP allows for sequential attempts to a list of destinations for scenarios like "hunt groups" or "follow-me/find-me". In this case, SIP allows for trying to connect to endpoints in a list and the first successful connect terminates the connect attempts. Another SIP scenario allows for parallel or simultaneous connection attempts and the first successful connect causes a cancellation of the other pending connect attempts.

The scope of a set of "targetEndPoints" is a single Interaction. Each Interaction starts "anew" and establishes its set of "targetEndPoints" for the "consider_Connect"/"synchronous_connect" Interaction Behavior.

connectConstraints: a list of any constraints applied to the set of total circumstances of the attempted communication, one which may be the user. In practice this could comprise a data structure map containing those constraints which were found, after checking by the consider constraints Interaction Behavior, to apply for the context under consideration. The data type of the map entries is a pair of character strings, the first of which identifies the source network element, network level service, or capability of the constraint found, and the second of which identifies the specific constraint. Examples of such constraints include presence check, credit-worthiness check, call barring. An example of such an entry would be:
("http://com.bt.commonCapabilities.PresenceService", "Not present");

connectResult: the result of the requested service control flow, including any connection attempts carried out as part of the service flow; the status of the connection attempt. The possible values of this field and their associated semantics are:
  OK—the connection attempt was successfully completed;
  Error—the connection attempt was made, but not successfully completed;
  No connect attempt—the connection attempt was not made due to an applicable constraint or other failure condition such as an invalid URI.

connectStatus: the response to the connect request. In practice this could comprise a SIP response status code with reference to whether the connect succeeded or failed, spanning the values of the domain specified for this parameter in the SIP Servlet spec: SIP responses have a three-digit status code that indicates the outcome of the corresponding request, for example (from IETF RFC 3261):

1xx: Informational—request received, continuing to process the request;
2xx: Success—the action was successfully received, understood, and accepted;
3xx: Redirection—further action needs to be taken in order to complete the request;
4xx: Client Error—the request contains bad syntax or cannot be fulfilled at this server;
5xx: Server Error—the server failed to fulfill an apparently valid request;
6xx: Global Failure—the request cannot be fulfilled at any server.

Although any legitimate SIP response code may appear in this field, there is a significant subset that are further processed by and Interaction. This subset minimally contains the following status codes:
  SC_ACCEPTED
    Status code (202) indicating that the request has been accepted for processing, but the processing has not been completed.
  SC_BUSY_EVERYWHERE
    Status code (600) indicating that the callee's end system was contacted successfully but the callee is busy and does not wish to take the call at this time
  SC_BUSY_HERE
    Status code (486) indicating that the callee's end system was contacted successfully but the callee is currently not willing or able to take additional call
  SC_CALL_BEING_FORWARDED
    Status code (181) indicating the call is being forwarded
  SC_CALL_LEG_DONE
    Status code (481) indicating Call Leg/Transaction does not exist.
  SC_DECLINE
    Status code (603) indicating that the callee's machine was successfully contacted but the user explicitly does not wish to or cannot participate
  SC_MOVED_TEMPORARILY
    Status code (302) indicating that the callee has moved temporarily.
  SC_OK
    Status code (200) indicating the request succeeded normally.
  SC_PAYMENT REQUIRED
    Status code (402) indicating that the caller needs to make a payment.
  SC_REQUEST_PENDING
    Status code (491) indicating that the request was received by a UAS that had a pending request within the same dialog
  SC_REQUEST_TERMINATED
    Status code (487) indicating that the request was terminated by a BYE or CANCEL request.
  SC_SESSION_PROGRESS
    Status code (183) carries miscellaneous call progress information
  SC_TRYING
    Status code (100) indicating the server is trying to locate the callee.

connectResponse: contains the response (see field 7 above) data from the highest precedent SIP invitee. This is most often the data from the first invitee with which a successful dialog has been established. However, these contents are application dependent and in some circumstances the definition of "highest precedent" may lead to a different result.

connectDeliverable: a Map data structure containing arbitrary output defined by the resource which was connected to; in other words, a connection specific payload. The data type of the map entries is a string. An example is specific DTMF collected from a user during a "consider_connect" IVR or media server conversation with the end user.

CXDN Events

CXDN provides two kinds of inter-component communication events. One is Intentional Events that represent user intentions. The other is Coordinating Events that are used between Interaction Sequences, Interactions and Interaction Behavior implementing Service Building Blocks. Both kinds of events are sub-typed into different event types. These events are implemented in Cxf and are reusable across service designs and implementations.

Intentional Events

Intentional Events represent user intentions to alter his/her communication experiences. An Intentional Event is a translation of the user's gesture on their device (endpoint) into a formalized representation. These events trigger a particular Interaction Sequence or affect the flow of an already "in flight" Interaction Sequence. According to a preferred embodiment, three types of Intentional Events have been identified and developed but other types may be added.

Connect, Move, Notify and Terminate events correspondingly signify the user's intent to connect to a resource (endpoint), change connected resources, indicate a change in endpoint presence and terminate a connection. These events trigger Interaction Sequences to orchestrate a series of resource Interactions to achieve the intent.

Coordinating Events

A second class of events that are not related to user gestures, but are used to coordinate between Interactions are Coordination Events. Coordinating Events carry the message data payload (CxfContext) between components within an Interaction Sequence. They are passed between an Interaction Sequence and its Interactions. They pass through the calls to and from Interaction Behavior implementing Service Building Blocks. According to a preferred embodiment, the types of coordination event are: Context Event—used to pass contextual data between components prior to ultimate resolution of the intent; and Result Event—represents the realization of the user's intent.

Reuse

Service Building Blocks (SBB) are configurable with elective behaviour. Each SBB has an inherent characteristic or role but the specific operation performed by a SBB is determined by the context in which it is called. Consider an SBB that implements the 'Consider Constraints' Interaction Behaviour. The SBB could invoke many different constraint expressions by means of selecting an appropriate common capability.

Common Capabilities are application neutral, context free interfaces to network resources. SBBs combine application-specific semantics (logic) i.e. internal processes with calls to external common capabilities in a way that provide services to the Application Building Block (ABB) layer, i.e.: the layer that hosts Interaction Sequences and Interactions.

Referring, once more, to FIG. 4, the SBB corresponding to Consider Connect Constraints Interaction Behaviour (12, 22) is shown by way of example. For the proposed 2-Way SMS service, the Consider Out SMS Connect Result SBB makes a call to Common Capability "eWallet" to clear/commit a charge for pre-pay and it makes a call to Common Capability "Credit". Conditionals within the SBB test which Common Capability call is appropriate by looking up Profile information for the service user in the Cxf Context.

According to a preferred embodiment, a constraint expression typically invokes a plain old Java object (POJO) method that in turns calls one or more Common Capability operations. The constraint expressions are applicable across many different Interactions and by extension many different services. Advantageously, the POJOs are reusable across different SBBs and, from the point of view of the SBB, all POJOs implement the same simple interface that accepts the CxfContext and returns CxfContext for processing or passing to the next POJO (as appropriate).

Configuration (Config Points)

Each SBB called by an Interaction Behaviour may be configured at runtime (i.e. upon receipt of a call from the associated Interaction Behavior), by passing to the SBB configuration data that prescribe which constraints to execute. This provides a powerful way to achieve reuse of SBBs resulting in a relatively small collection of configurable (data-driven) SBBs. Configuration data can be passed during a call from an Interaction Behavior to a SBB, for example expressed in variables using XML. We refer to configuration data embedded in SBB calls as Configuration Points (Config Points).

The small inventory of SBBs could be evolved with zero effect on the Interactions by having the configuration data positively elect which expressions we wish to employ.

Processing the Cxf Context

Fields 51-59 of the Cxf Context structure 50, described above with reference to FIG. 5, are manipulated over the course of an interaction or interaction sequence. Fields 51-59 are set and read by various ones of the interaction behaviors 11-14 and 21-26 described above with reference to FIGS. 2a and 2b.

Example 1

Join Conference

The sequence of processing of Cxf Context structure 50 by the first two interactions 34, 36 in the Join Conference interaction sequence 30 shown in FIG. 3 will now be described in detail, by way of example.

Initial Processing by the Join Conference Interaction Sequence 30:
1. The original SIP Invite is received by the interaction sequence via a Connect Event 32, and the EstablishContext interaction behavior is called.
2. The EstablishContext interaction sequence behavior (not shown) populates the originalRequest 51, productElementID 52 and userID 53 fields of Cxf Context structure 50 (shown in FIG. 5).
3. Control is returned to the Join Conference Interaction Sequence 30.
4. Join Conference Interaction Sequence 30 transfers control to Welcome Video Interaction 34, together with Cxf Context data structure 50.

Processing by Welcome Video Interaction 34:
1. Welcome Video Interaction 34 receives Cxf Context data structure 50 and calls EstablishTargetEndpoints interaction behavior 21 (see FIG. 2a);
2. EstablishTargetEndpoints interaction behavior 21 determines the sequence of connections (within the scope of the current Interaction) and populates targetEndpoints field 54 of Cxf Context data structure 50. The first entry in the linked map structure 54 is a reference to a media server which provides the welcome video for the conferencing service. The second entry is a reference to a server that provides an authorization service for the video conference service. Control is returned to Welcome Video Interaction 34;

3. Welcome Video Interaction 34 calls ConsiderConnectConstraints interaction behavior 22. In this case there are no constraints and connectConstraints field 55 is empty;
4. Control is returned to Welcome Video Interaction 34 with Cxf Constraints data structure 50 (updated as appropriate);
5. Welcome Video Interaction 34 invokes ConsiderConnect interaction behavior 23 passing Cxf structure 50 through a Context Event;
6. ConsiderConnect interaction behavior 23 finds the address of the media server in the targetEndpoints field 54 of Cxf Connect data structure 50 and connects the user that sent the original SIP invite to the media server. The identity of the user is provided in UserID field 53 of Cxf data structure 50. Control is returned to Welcome Video Interaction 34, with the status of the attempt set in ConnectStatus field 57 of Cxf Connect data structure 50. The connection is achieved through normal SIP signaling. The original request/invite data (CxfContext.requestData) is used to create a new request/invite. Normal SIP signaling occurs. The CxfContext.connectStatus is set to the status code returned in the SIP response (200/OK for success). The response data is used to populate the CxfContext.responseData. The ConsiderConnect interaction behavior then calls back to the interaction.
7. Welcome Video Interaction 34 invokes Wait for Reply interaction behavior 24. Wait for Reply interaction behavior 24 handles the return of control from the media server upon completion of the greeting message and the collection of any required input from the user. Upon receipt of the reply, control is passed back to Welcome Video Interaction 34.
8. Welcome Video Interaction 34 invokes ConsiderResult interaction behavior 25. Generally, any relevant post-result processing occurs at this point; in the case of a successful connection, no processing occurs other than, perhaps, logging. Control is returned to Welcome Video Interaction 34.
9. Welcome Video Interaction 34 returns control to Join Conference Interaction Sequence 30 with the return result, contained in the fields of Cxf Context data structure 50, as described.

Further Processing by Join Conference Interaction Sequence 30:

1. Upon return of the result by Welcome Video Interaction 34, Join Conference Interaction Sequence 30 invokes the second interaction in the sequence, Select/Auth Conference Interaction 36, passing Cxf Context data structure 50.

Processing by the Select/Auth Conference Interaction 14:

1. Select/Auth Conference Interaction 36 is invoked and passed Cxf Context data structure 50, updated by the Welcome Video interaction 34;
2. Select/Auth Conference Interaction 36 invokes EstablishEndpoints interaction behavior 21, passing Cxf Context data structure 50;
3. EstablishTargetEndpoints interaction behavior 21 identifies the address of an authorization server for the Video Conference service from targetEndpoints field 54 of Cxf Context data structure 50. Control is returned to Select/Auth Conference Interaction 36, with Cxf Context data structure 50;
4. Select/Auth Conference Interaction 36 invokes ConsiderConstraints interaction behavior 22. No constraints exist in this case and control is returned to Select/Auth Conference Interaction 36.
5. Select/Auth Conference Interaction 36 invokes ConsiderConnect interaction behavior 23, passing the Cxf Context data structure 50; (or, in a possibly more efficient mode, a reference to the Cxf Context data structure).
6. ConsiderConnect interaction behavior 23 connects the SIP session of the user to the authorization server. The authorization server collects the UserID and any additional authorization or authentication information required for login to the service. Control is returned to Select/Auth Conference Interaction 36 which invokes WaitforReply interaction Behavior 24.
7. Simultaneously, ConsiderConnect interaction behavior 23 either validates the credentials of the user or invalidates the connection attempt, returning the appropriate status in ConnectResult field 56 and Connect Status field 57. In the event that the user's credentials were invalid, the ConnectResult field value is "Error" and the ConnectStatus field value is representative of the reason for the failure (see the SIP Status Codes above). For valid credentials, the field values are "OK" and "200", respectively. Control is returned to Select/Auth Conference Interaction 36 through WaitforReply interaction behavior 24.
8. Select/Auth Conference Interaction 36 invokes ConsiderResult interaction behavior 25;
9. Select/Auth Conference Interaction 36 returns the result to Join Conference Interaction Sequence 30.

Further processing by Join Conference Interaction Sequence 30:

1. Join Conference Interaction Sequence 30 assesses the result of the execution of Select/Auth Conference Interaction 36. In the case that the authorization was successful, Join Conference Interaction Sequence 30 invokes Wait for Host Video Interaction 38; otherwise the Thank You for Trying Video Interaction 40 is invoked.

Example 2

Two Way SMS

This embodiment is directed to a service called "Two-Way SMS" (2wSMS). 2wSMS is a server-side hosted service that sends and receives Short Message Service (SMS) text messages from/to a VOIP client, e.g. on a user's personal computer.

It might be helpful to start with a brief overview of the 2wSMS. To initiate the sending of a SMS text message, the VOIP client sends a text-based message (a SIP request of type MESSAGE). This message is dispatched by the 2wSMS service through a gateway messaging facility for delivery to another SMS client external to the current network (for example a GSM handset operating in a mobile telephone network). 2wSMS also provides the ability to receive an SMS text message. Incoming SMS text messages are pre-translated by the messaging facility gateway (a common capability) into a SIP MESSAGE. If the VOIP client is not present, the incoming message will be sent (buffered) to a persistent message storage facility (another common capability). When the VOIP client comes back online, it notifies 2wSMS and any buffered incoming messages are retrieved from the message storage facility and relayed to the VOIP client.

2wSMS therefore comprises three discrete service elements that in concert provide a complete service. The service elements, which will each be described in greater detail, next, are:

(a) SMS Out—sends an SMS text message from a VOIP client.
(b) SMS In—receives an SMS text message from another client and dispatches it to a VOIP client.
(c) SMS Notify—dispatches any "offline" buffered received SMS messages to a VOIP client when it comes online.

SMS Out

Figure 6:
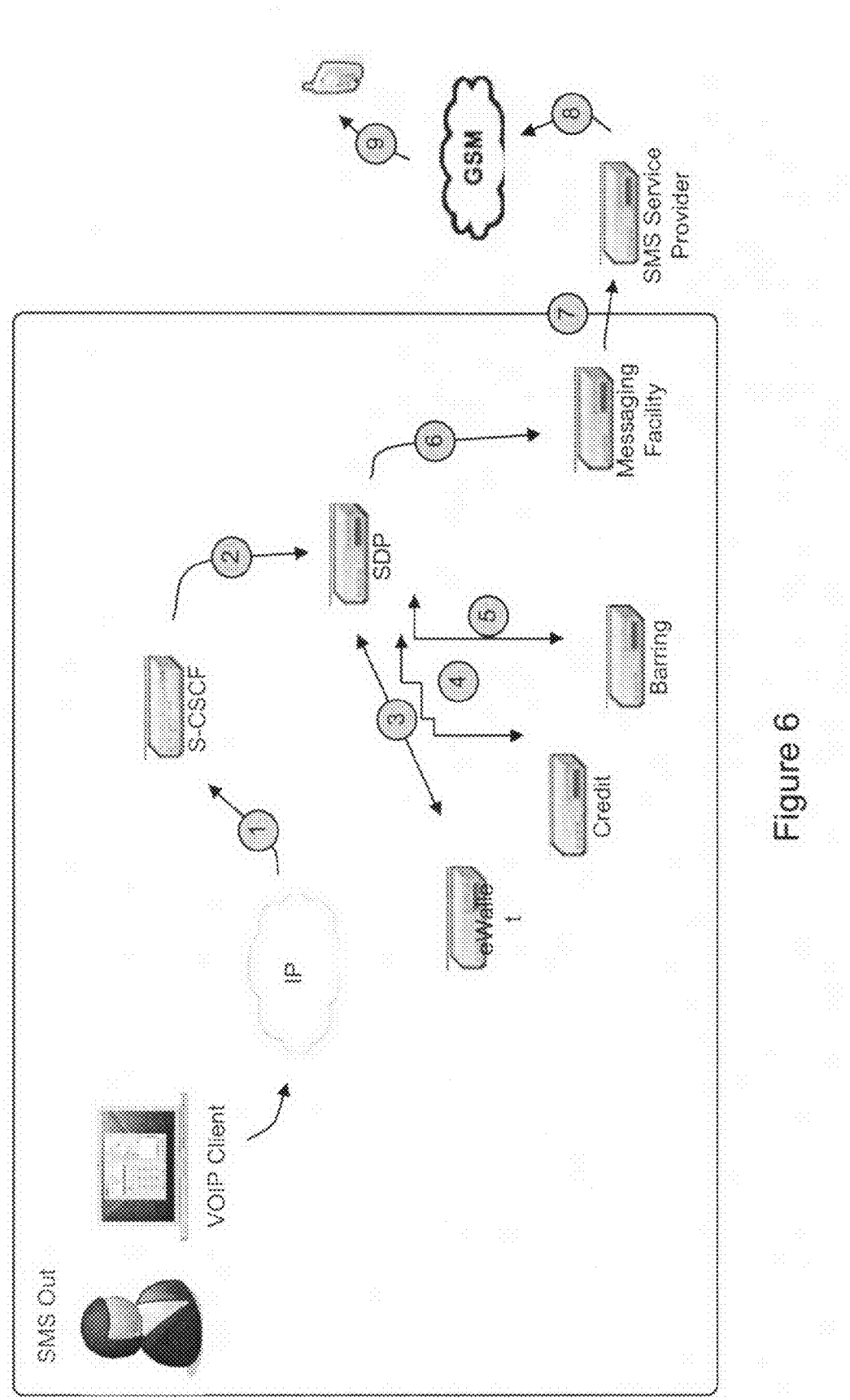
FIGS. 6 to 8 show schematics of communications network components according to embodiments of the present invention.

The SMS Out process will now be described in detail with reference to FIG. 6 which illustrates the following exemplary operation. In the following, the paragraph numbers correspond to the messages shown in the Figure by numbered arrows.

1. The VOIP client 61 sends a SIP MESSAGE request via IP network (represented in the Figure by the IP cloud) with the message text. The SIP MESSAGE request is received by serving call session control function (S-CSCF) IP multimedia subsystem (IMS) node. This node is responsible for routing the request to the appropriate application server for the message.
2. The request gets routed to the application server/service delivery platform (SDP) 63 that is hosting the 2wSMS service elements. SDP 63 routes the incoming request to the 'SMS Out' service element.
3. If the customer is prepay then their eWallet balance is tested with eWallet common capability 64 and if sufficient funds are available these funds are reserved.
4. If the customer is post pay then their credit worthiness is tested with Credit common capability 65.
5. The target endpoint (destination) of the message tested with Barring common capability 66 for whether it is 'barred'.
6. The message is then relayed to Messaging Facility 67. Messaging Facility 67 abstracts away the mechanics of message delivery and receipt. Since SMS is not a guaranteed delivery service, this call is a simple synchronous call with no receipt confirmation callback. On a receipt of a return code "success" from Messaging Facility 67 and in the event that the customer is prepay, their eWallet reserved funds are cleared. If the return code is "fail", then the funds are released.
7. Messaging Facility 67 relays the message to outside SMS Service Provider 68.
8. SMS Service Provider 68 sends the SMS message to the destination GSM phone via an external telephone network represented in the Figure by the GSM cloud.
9. GSM phone 69 receives the SMS message.

SMS In

Figure 7:
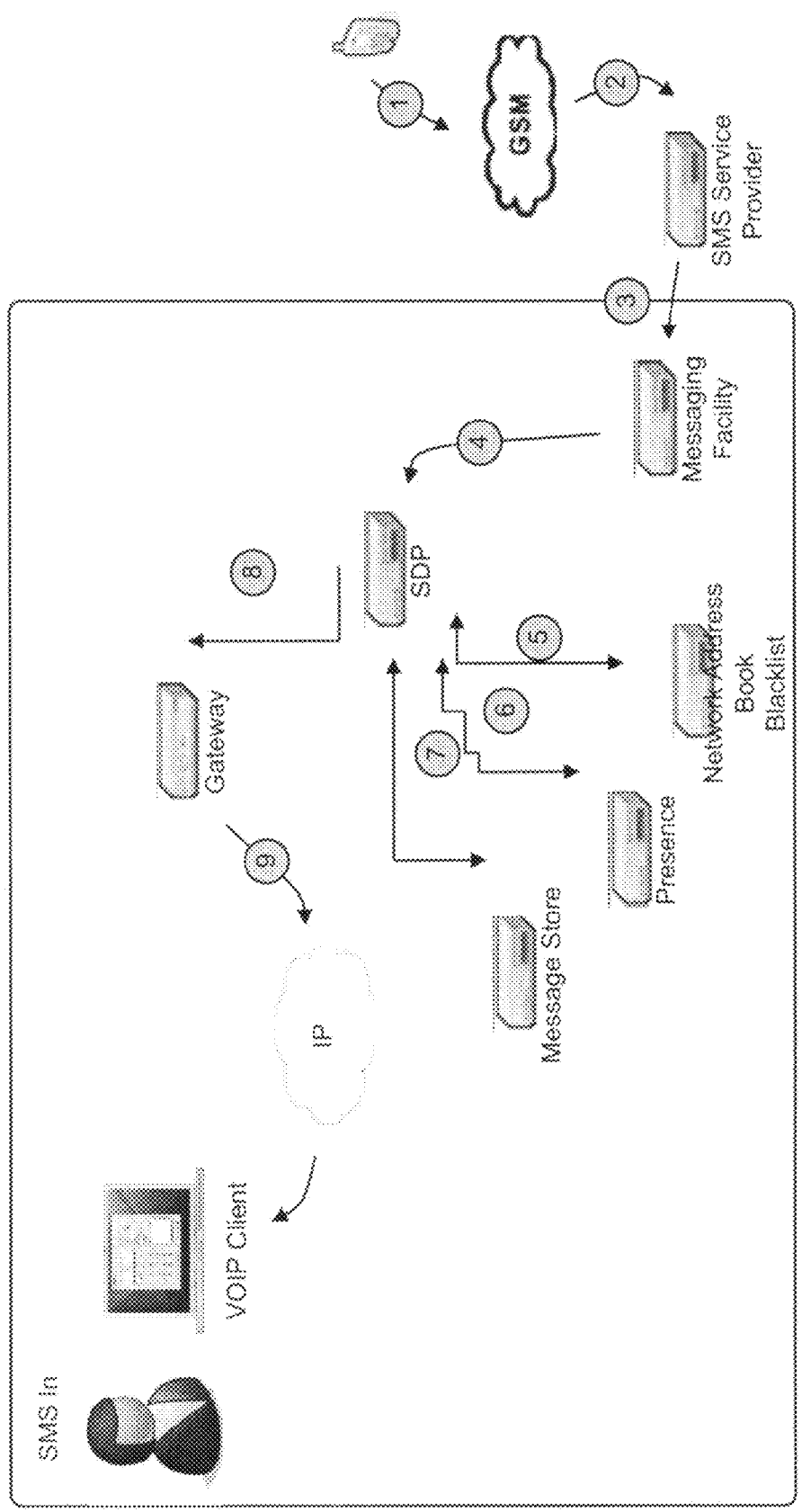

The SMS In process will now be described in detail with reference to FIG. 7 which illustrates the following exemplary operation. In the following, the paragraph numbers correspond to the messages shown in the Figure by numbered arrows.

1. GSM phone 79 sends an SMS message into the GSM network represented in the Figure by the GSM cloud.
2. The GSM network relays the SMS message to SMS Service Provider 78 where the VOIP client is registered.
3. SMS Service Provider 78 relays the SMS message to the VOIP client's domain where it is captured by Messaging Facility 77.
4. Messaging Facility 77 relays the SMS message to SDP 73 that is hosting 2wSMS. The SMS message is translated by Messaging Facility 77 into a SIP MESSAGE request. SDP 73 routes the incoming MESSAGE to the 'In SMS' service element.
5. The SMS In service element tests the recipient's hosted network address book with common capability 76 to determine if the sender is blacklisted from sending SMS message s to VOIP client 71.
6. Presence service common capability 75 is then called to see if VOIP client 71 is 'online.'
7. If VOIP client 71 is not present, then the incoming message is saved through a call to Message Store service 74.
8. Assuming none of the above constraints apply, the message is dispatched to gateway 72 for relaying to VOIP client 71.
9. VOIP client 71 receives the message.

SMS Notify

Figure 8:
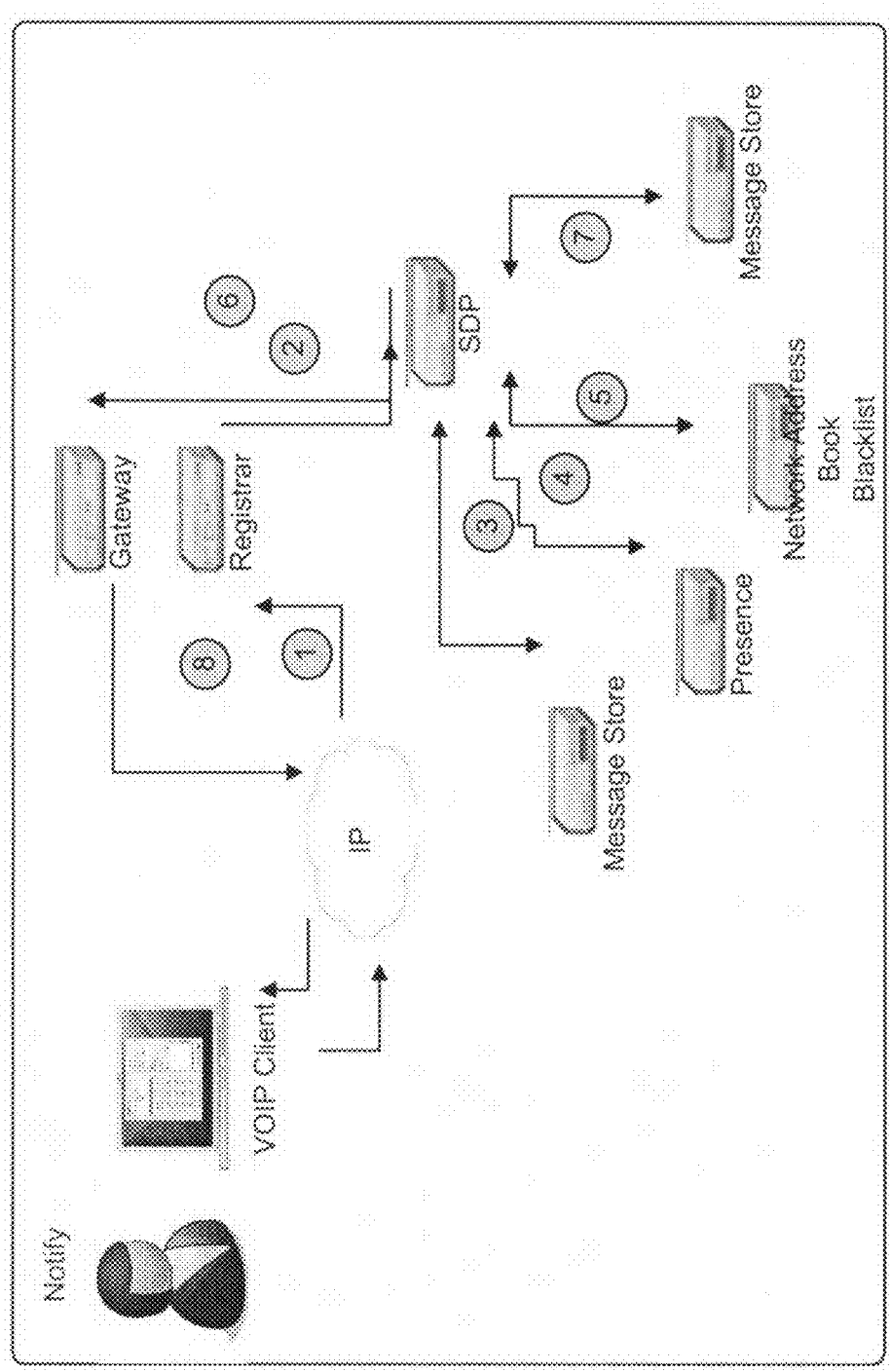

The SMS Notify process will now be described in detail with reference to FIG. 8 which illustrates the following exemplary operation. In the following, the paragraph numbers correspond to the messages shown in the Figure by numbered arrows.

1. When VOIP client 81 comes online it sends a SIP REGISTER request indicating its presence to its Registrar 82.
2. Registrar 82 then sends a SIP NOTIFY request to the presence subscribers. SMS Notify service element is one such subscriber. It is hosted along side of SMS Out and SMS In service elements on SDP 83. SDP 83 routes the incoming NOTIFY request to the SMS Notify service element.
3. SMS Notify service element then queries persistent Message Store 84 for any buffered messages that arrived from the SMS In process while VOIP client 81 was away. SMS Notify loops over this step and the following four steps repeatedly until all buffered messages are delivered or VOIP client 81 goes back offline.
4. SMS Notify service element then re-tests Presence with common capability 85 just in case VOIP client 81 has dropped back offline.
5. SMS Notify service element then re-tests blacklisted entries in the Network Address Book with common capability 86 for entries that may prohibit message delivery.
6. The Message is then dispatched to Gateway 88 for delivery to VOIP client 81.
7. The Message is then removed from persistent store 84.
8. Gateway 88 delivers the Message to VOIP client 81.

Two-Way SMS Design

Figure 9:
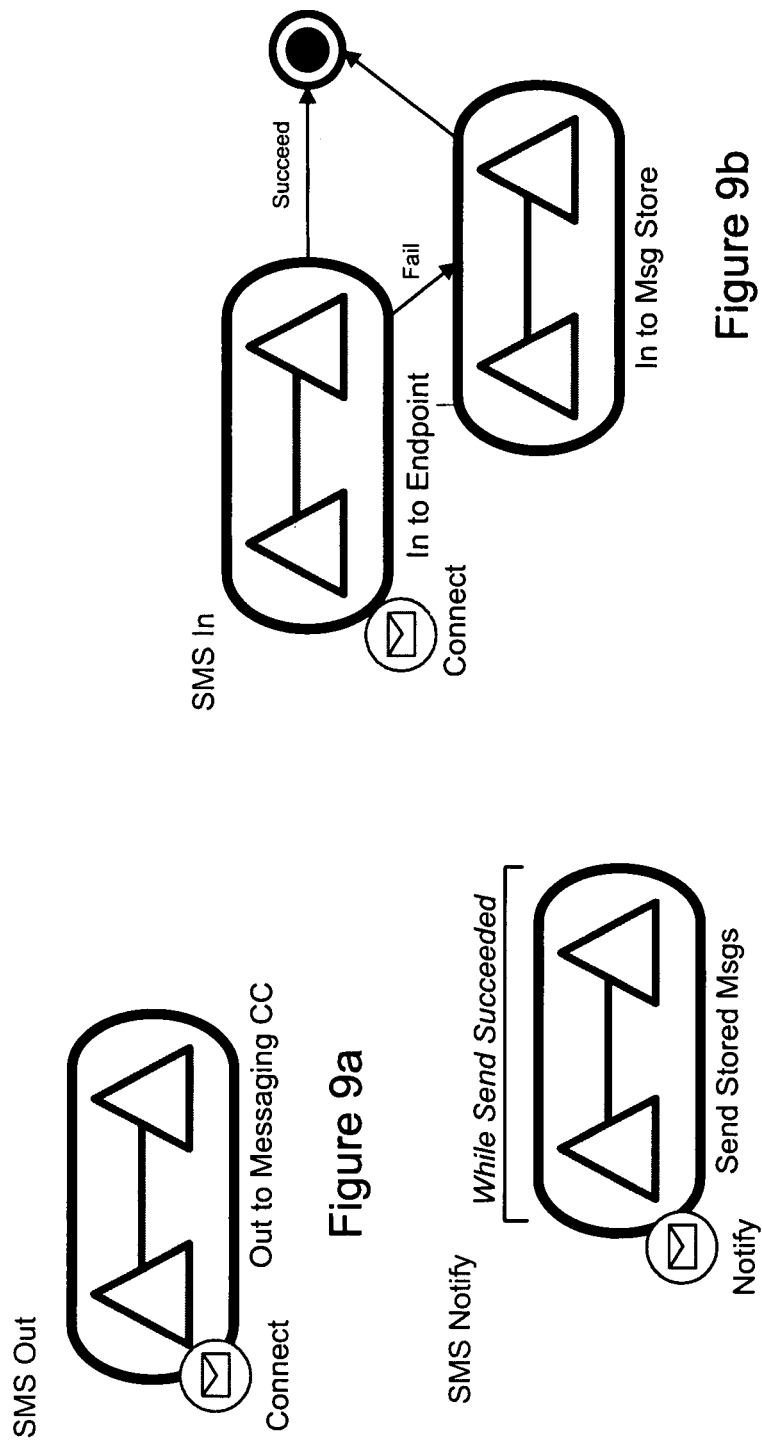
FIGS. 9a, 9b and 9c show symbols for reusable components according to embodiments of the present invention.

Each of the above service elements: SMS Out, SMS In, and SMS Notify are Interaction Sequences illustrated in FIGS. 9a, 9b and 9c using CXDN notation. As shown in FIG. 9a, the SMS Out Interaction Sequence has a single Interaction— "Out To Messaging". As shown in FIG. 9b, the SMS In Interaction Sequence has two Interactions—"In to Endpoint" and "In to Msg Store". As shown in FIG. 9c, the SMS Notify Interaction Sequence has a single Interaction—Send Stored Messages"—but differs from SMS Out and SMS In that the single Interaction may loop, as indicated by the bracket "while send succeeded" to clear more than one message from the store.

SMS Out Implementation

2wSMS Out Interaction Sequence will now be described in more detail to identify its components parts, with reference to FIGS. 10 and 11.

Figure 10:
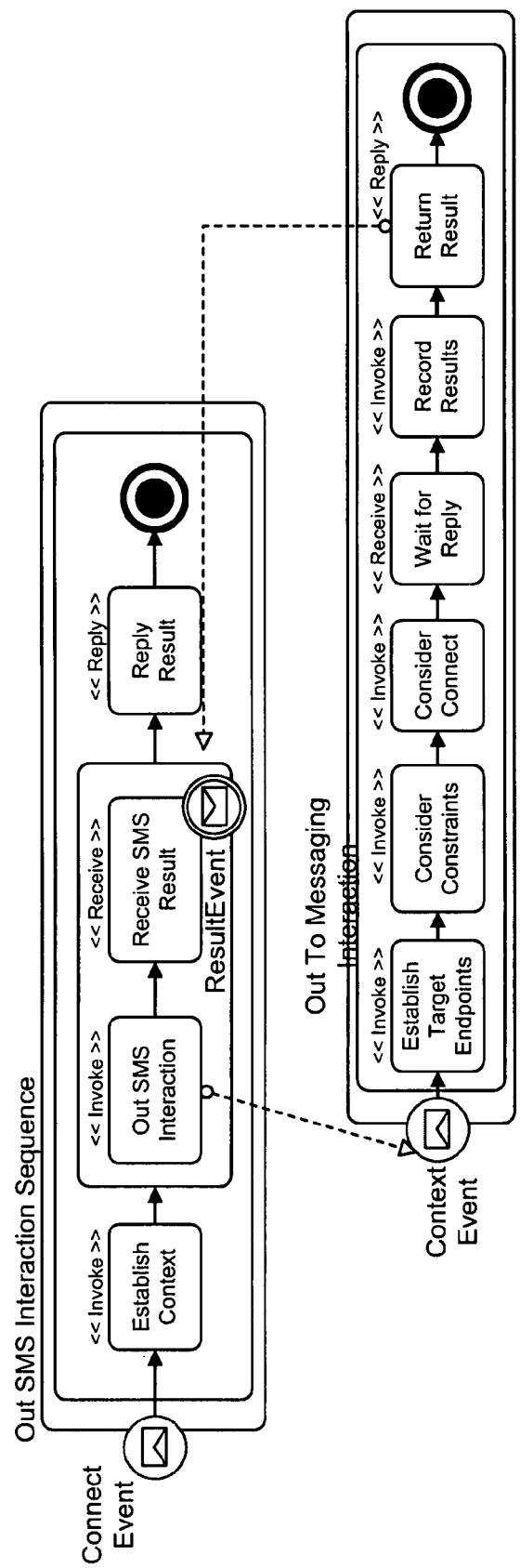
FIG. 10 shows a schematic for further reusable components according to embodiments of the present invention.

FIG. 10 shows the SMS Out Interaction Sequence of FIG. 9a in more detail. As shown in FIG. 10, SMS Out Interaction Sequence 1010 comprising Establish Context SBB 1012; Out SMS Interaction 1014; Receive SMS Result BPEL activity 1016; and Reply Result SBB 1018. In operation, SMS Out Interaction Sequence 1010 calls Out To Messaging Interaction 1020. Out To Messaging Interaction 1020 in turn comprises Interaction behaviours 1021-1026 which correspond with the standard interaction behaviours 21-26, described above with reference to FIG. 2a.

The operation of SMS Out Interaction Sequence 1010 will now be described with reference to FIG. 10. Activity is initiated by receipt from a calling SBB (not shown) of a ConnectEvent. FIG. 10 shows SMS Out Interaction Sequence 1010 synchronously calling Establish Context SBB 1012 and passing to it the received ConnectEvent to enable the SBB 1012 to create the required CxfContext data structure and wrap it in a ContextEvent. The resultant ContextEvent is passed to SMS Out Interaction Sequence 1010 which then asynchronously calls Out To Messaging Interaction 1020, passing the newly created ContextEvent. SMS Out interaction Sequence 1010 then proceeds to its next BPEL activity, Receive SMS Result 1016; to wait to receive a call-back from the called Interaction 1020. Out To Messaging Interaction 1020 proceeds through each of its Interaction behaviours 1021-1026 to send the message, in a manner similar to that described above with reference to FIG. 2a. Out To Messaging Interaction 1020 replies to Interaction Sequence 1010 with a ResultEvent. SMS Out Interaction Sequence 1010 passes the received ResultEvent to Reply Result SBB 1018 that in turn replies to it's calling SBB (not shown), as described next.

High Level Walk Through SMS Out Service Element

Figure 11:
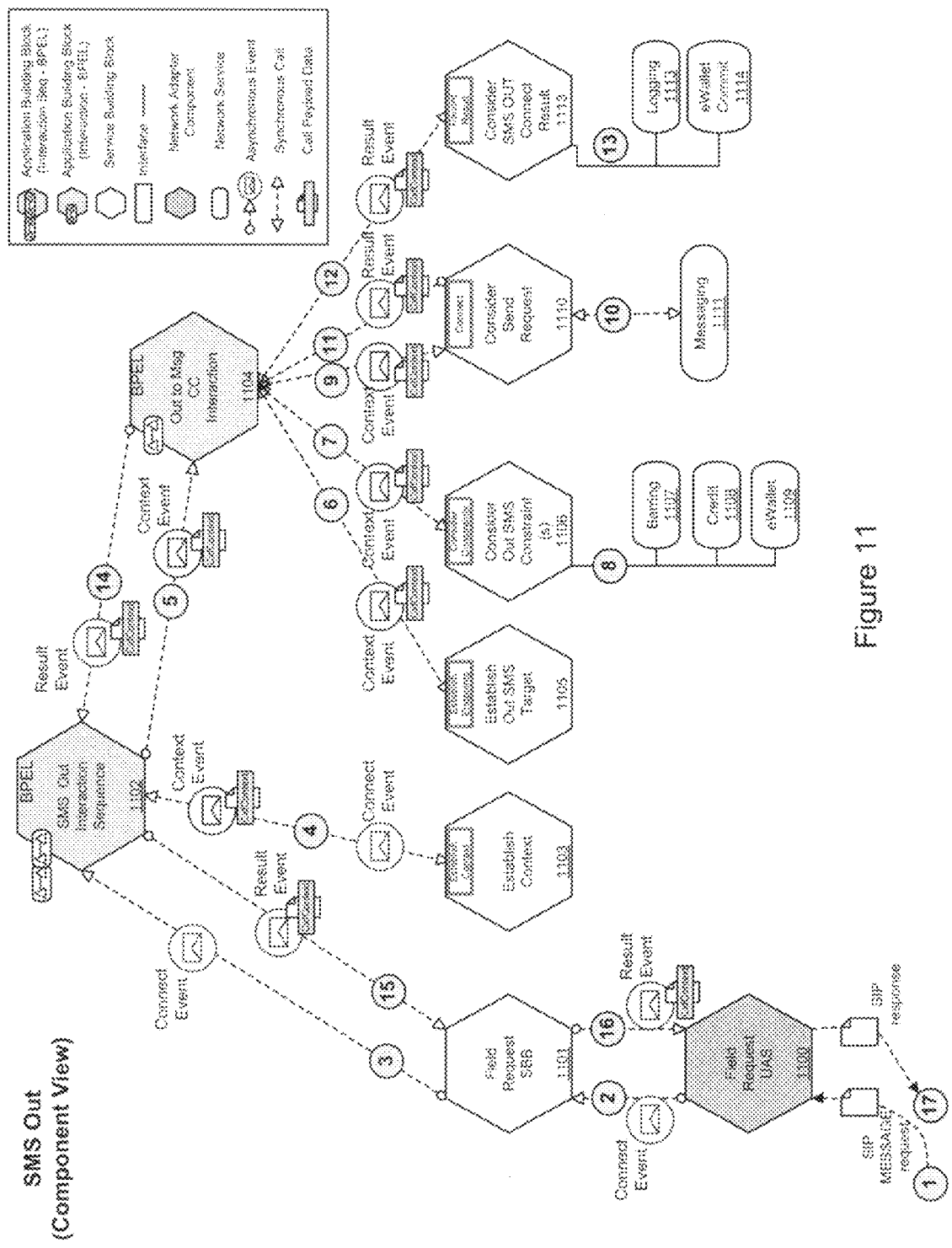
FIGS. 11 to 13 show schematics of detailed control flows according to embodiments of the present invention.

FIG. 11 shows the whole SMS Out process in more detail, using CXDN notation. The SMS Out process will now be described in detail with reference to FIG. 11 which illustrates the following exemplary operation. In the following, the paragraph numbers correspond to the messages shown in the Figure by numbered arrows.

We shall begin with a brief overview of the individual steps in the process:

1. A SIP MESSAGE request arrives.
2. Field Request Network Adapter Component (NAC). User Agent Server (UAS) 1100 receives the request and instantiates a ConnectEvent which it populates with a copy of the original SIP MESSAGE request. It then asynchronously relays ConnectEvent to Field Request SBB 1101. UAS is a SIP term for an agent that acts as a server to receive a request.
3. The Field Request SBB in turn asynchronously invokes SMS Out Interaction Sequence 1102, passing the ConnectEvent in the invocation.
4. SMS Out Interaction Sequence 1102 makes a synchronous call to Establish Context SBB 1103. This SBB create a ContextEvent, populating it with a new CxfContext and sending it back to SMS Out Interaction Sequence 1102. The CxfContext contains a copy of the original SIP MESSAGE request.
5. Next, SMS Out Interaction Sequence 1102 asynchronously calls Out to Msg CC Interaction 1104.
6. Out to Msg CC Interaction 1104 first synchronously calls Establish Out SMS Target SBB 1105 that implements the Establish Target Endpoints Interaction behavior, passing it the ContextEvent. SBB 1105 retrieves the CxfContext from the ContextEvent. SBB 1105 then retrieves the 'to' URI from the original SIP MESSAGE request held by the CxfContext and adds it to the targetEndpoints LinkedHashMap (54 in FIG. 5) in the CxfContext which is returned to the interaction 1104.
7. Now Out to Msg CC Interaction 1104 calls Consider Out SMS Constraints SBB 1106 that implements the Consider Constraints Interaction behavior, passing it the ContextEvent.
8. SBB 1106 calls three POJOs (not shown)—one for each of three constraints: Barring 1107, Credit 1108, and eWallet 1109. For any of these constraints that apply, the POJOs populate the CxfContext connectConstraints map (55 in FIG. 5) with their identity, and a warning message describing the applied constraint. The ContextEvent with the CxfContext is then returned to Interaction 1104.
9. Out to Msg CC Interaction 1104 then asynchronously calls Consider Send Request SBB 1110 that implements the Consider Connect Interaction behavior, passing it the ContextEvent.
10. If CxfContext connectConstraints map is empty then the SBB 1110 invokes Messaging Facility 1111 to deliver the message. In this case, the CxfContext connect status is set to 200 (OK) and the result is set to "success". If there was an error in the send or there were constraints present in connectConstraints then the appropriate CxfContext connect status is set and the result is set to "fail". Finally, a response is created and populated into CxfContext, a new ResultEvent is created with the CxfContext.
11. SBB 1111 now asynchronously calls back to the Out to Msg CC Interaction 1104, passing back the ResultEvent.
12. Out to Msg CC Interaction 1104 synchronously calls Consider SMS Out Connect Result SBB 1112 that implements the Record Results Interaction behavior e.g. via Logging common capability 1113 or a lower level, e.g. programming language level, service such as Log 4J.
13. Consider SMS Out Connect Result SBB 1112 logs the service invocation and commits funds out of the eWallet account via eWallet Commit 1114. SBB 1112 returns the ResultEvent to Interaction 1104.
14. Out to Msg CC Interaction 1104 asynchronously calls back to SMS Out Interaction Sequence 1102, passing the ResultEvent.
15. SMS Out Interaction Sequence 1102 asynchronously calls back Field Request SBB 1101.
16. Field Request SBB 1101 asynchronously calls back to Field Request UAS NAC 1100.
17. Field Request UAS NAC 1100 sends the SIP response to the original SIP MESSAGE requestor (not shown).

Detailed Walk Through of SMS Out

We shall now go through each of the above steps 1 to 17 of the SMS Out process in more detail, detailing portions of exemplary code that may be used to implement the process, according to a preferred embodiment. Still referring to FIG. 11 and referring back to FIG. 6:

First, a SIP MESSAGE request arrives. An example:

---

Example SIP MESSAGE request

MESSAGE sip:bob@localhost:5063;transport=udp SIP/2.0
Call-ID: 8912f8d576e36a46e1c227000cfe120f@192.168.0.6
CSeq: 2 MESSAGE
From: "david" <sip:david@localhost>;tag=textclientv1.0
To: <sip:bob@localhost:5063>
Via: SIP/2.0/UDP 192.168.0.6:5062;branch=z9hG4bK3678ade0486bc080c4b3cedae412a58d
Max-Forwards: 70
Contact: "david" <sip:david@192.168.0.6:5062>
Content-Type: text/plain
Content-Length: 5
test1

This is a SIP MESSAGE request from sip: david@localhost:5062 to bob@localhost:5063. The message text is "test1".

SDP 63 is configured to route these kinds of SIP requests to Field Request UAS NAC 1100. This configuration follows a standard for SIP Servlets and looks as follows:

| SIP Message to SIP servlet mapping from sip.xml |
| --- |

```xml
<servlet-mapping>
    <servlet-name>RecvSmsUasSipServlet</servlet-name>
    <pattern>
        <and>
            <equal ignore-case="true">
                <var>request.method</var>
                <value>MESSAGE</value>
            </equal>
            <equal ignore-case="true">
                <var>request.to.uri.user</var>
                <value>bob</value>
            </equal>
        </and>
```

| SIP Message to SIP servlet mapping from sip.xml |
| --- |
| -continued |

```xml
    </pattern>
</servlet-mapping>
```

The RecvSmsUasSipServlet is a sub component of the Field Request UAS NAC 1100. Notice that we've simplified the mapping to just this example. Each request of type "MESSAGE" that is targeted to user "bob" is mapped to RecvSmsUasSipServlet. A real mapping would trigger from other data in the request that indicates that the request is from a domain hosted VOIP client.

1. RecvSmsUasSipServlet receives the SIP MESSAGE request from which a ConnectEvent is created containing all the request data.
2. This event is then sent to the Field Request SBB 1101.
3. Field Request SBB 1101 relays the event upward to the SMS Out Interaction Sequence ABB 1102.

SMS Out Interaction Sequence ABB 1102 is implemented in BPEL. Suitable source follows:

| BPEL source for "SMS Out Interaction Sequence" |
| --- |

```xml
<!-- bt.com -->
<process name="SmsOutIS" targetNamespace="http://bt.com/2waysms"
suppressJoinFailure="yes" xmlns:tns="http://bt.com/2waysms"
xmlns="http://schemas.xmlsoap.org/ws/2003/03/business-process/"
xmlns:bpelx="http://schemas.oracle.com/bpel/extension"
xmlns:ora="http://schemas.oracle.com/xpath/extension"
xmlns:bpws="http://schemas.xmlsoap.org/ws/2003/03/business-process/"
xmlns:ns0="http://systinet.com/wsdl/com/bt/outSms/"
xmlns:ns1="http://systinet.com/wsdl/establishSmsContextInterface/"
xmlns:ns2="http://systinet.com/wsdl/com/bt/serviceAssemblyFramework/components/"
xmlns:ns3="http://systinet.com/wsdl/com/bt/serviceAssemblyFramework/event/"
xmlns:ns5="http://systinet.com/wsdl/com/bt/serviceAssemblyFramework/context/"
xmlns:ns4="http://systinet.com/wsdl/com/bt/messaging/">
    <partnerLinks>
        <partnerLink                                    name="ConnectService"
partnerLinkType="ns0:ConnectServiceLink"
            partnerRole="ConnectServiceProvider" myRole="CSBpelProvider"/>
        <partnerLink                      name="method-EstablishContextService-
establishSmsContextInterface
            .EstablishSMSContextSoofServlet"/>
    </partnerLinks>
    <variables>
        <variable name="ConnectEventMessage"
messageType="ns0:RecvOutSmsSbbSoofServlet_onSafConnectEvent_Request_Soap"/>
        <variable name="ContextRequest"
element="ns1:EstablishSMSContextSoofServlet_getContextEvent_Request_Soap"/>
        <variable name="ContextResponse"
element="ns1:EstablishSMSContextSoofServlet_getContextEvent_Response_Soap"/>
        <variable name="TargetRequest"
element="ns2:EstablishTargetEndpoints_getContextEvent_Request_Soap"/>
        <variable name="TargetResponse"
element="ns2:EstablishTargetEndpoints_getContextEvent_Response_Soap"/>
        <variable name="ResultRequest"
element="ns2:RecordConnectResults_getResultEvent_Request_Soap"/>
        <variable name="ResultResponse"
element="ns2:RecordConnectResults_getResultEvent_Response_Soap"/>
    </variables>
    <sequence name="main">
        <receive createInstance="yes" name="Receive_Connect_Event"
            partnerLink="ConnectService"
            portType="ns0:CS_BPEL_PT"
            operation="onSafConnectEvent"
            variable="ConnectEventMessage"/>
        <assign name="copy_1">
            <copy>
                <from variable="ConnectEventMessage"
                    part="parameters"
                    query="/ns0:onSafConnectEvent/ns0:p0"/>
                <to variable="ContextRequest"
                    part="parameters"
                    query="/ns1:getContextEvent/ns1:p0"/>
            </copy>
```

| BPEL source for "SMS Out Interaction Sequence" |
|---|
| ```
        </assign>
        <invoke name="EstablishContext"
            partnerLink="method-EstablishContextService-
establishSmsContextInterface.EstablishSMSContextSoofServlet"
            portType="ns1:EstablishSMSContextSoofServlet"
            operation="getContextEvent"
            inputVariable="ContextRequest"
            outputVariable="ContextResponse"/>
        <assign name="copy_2">
            <copy>
                <from variable="ContextResponse"
                    part="parameters"
query="/ns1:getContextEventResponse/ns1:result"/>
                <to variable="TargetRequest"
                    part="parameters"
                    query="/ns2:getContextEvent/ns2:p0"/>
            </copy>
        </assign>
        <invoke name="in_OutToMsgCCInteraction"
            partnerLink="OutToMsgCCInteractionService"
            portType="ns7:D_BPEL_PT"
            operation="onSafContextEvent"
            inputVariable="TargetRequest"/>
        <receive                                         createInstance="no"
name="Receive_OutToMsgCCInteractionResultEvent"
            partnerLink="OutToMsgCCInteractionService"
            portType="ns7:DS_BPEL_PT"
            operation="onSafResultEvent"
            variable="ResultResponse"/>
        <reply name="Reply_To_ConnectService"
            partnerLink="ConnectService"
            portType="ns0:CS_BPEL_PT"
            operation="onSafConnectEvent"
            variable="ResultResponse"/>
    </sequence>
</process>
``` |

4. The SMS Out Interaction Sequence ABB 1102 first calls Establish Context SBB 1103. SBB 1103 takes the ConnectEvent that contains the original SIP request data, creates a ContextEvent containing a CxfContext. CxfContext of course retains the original SIP request data plus has storage for all the data required for the Interaction call.

5. SMS Out Interaction Sequence 1102 then calls Out to Msg CC Interaction ABB 1104.

Suitable BPEL source for Out to Msg CC Interaction 1104 follows:

| BPEL source for "Out to Msg CC Interaction" |
|---|
| ```
<!-- bt.com -->
<process                                name="OutToMsgCCInteraction"
targetNamespace="http://bt.com/2waysms"
suppressJoinFailure="yes" xmlns:tns="http://bt.com/2waysms"
xmlns="http://schemas.xmlsoap.org/ws/2003/03/business-process/"
xmlns:bpelx="http://schemas.oracle.com/bpel/extension"
xmlns:ora="http://schemas.oracle.com/xpath/extension"
xmlns:bpws="http://schemas.xmlsoap.org/ws/2003/03/business-process/"
xmlns:ns0="http://systinet.com/wsdl/com/bt/outSms/"
xmlns:ns1="http://systinet.com/wsdl/establishSmsContextInterface/"
xmlns:ns2="http://systinet.com/wsdl/com/bt/serviceAssemblyFramework/components/"
xmlns:ns3="http://systinet.com/wsdl/com/bt/serviceAssemblyFramework/event/"
xmlns:ns5="http://systinet.com/wsdl/com/bt/serviceAssemblyFramework/context/"
xmlns:ns7="http://systinet.com/wsdl/com/bt/serviceAssemblyFramework/interaction/">
xmlns:ns4="http://systinet.com/wsdl/com/bt/messaging/">
    <partnerLinks>
        <partnerLink name="OutInteractionSequence"
            partnerLinkType="ns7:InteractionServiceLink"
            partnerRole="InteractionSequenceServiceProvider"
            myRole="InteractionServiceProvider"/>
        <partnerLink name="method-EstablishEndpointsService-com.bt
    .serviceAssemblyFramework.components.EstablishTargetEndpoints"/>
        <partnerLink name="method-ConsiderConstraintsService-com.bt
            .serviceAssemblyFramework.components.ConsiderConstraints"/>
        <partnerLink name="SendSmsService"
            partnerLinkType="ns4:SendSmsServiceLink"
``` |

| BPEL source for "Out to Msg CC Interaction" |
| --- |

```
            partnerRole="SendSmsServiceProvider"
            myRole="SendSmsBpelProvider"/>
        <partnerLink name="method-RecordConnectResultsService-com.bt
            .serviceAssemblyFramework.components.RecordConnectResults"/>
    </partnerLinks>
    <variables>
        <variable name="ConnectEventMessage"
messageType="ns0:RecvOutSmsSbbSoofServlet_onSafConnectEvent_Request_Soap"/>
        <variable name="ContextRequest"
element="ns1:EstablishSMSContextSoofServlet_getContextEvent_Request_Soap"/>
        <variable name="ContextResponse"
element="ns1:EstablishSMSContextSoofServlet_getContextEvent_Response_Soap"/>
        <variable name="TargetRequest"
element="ns2:EstablishTargetEndpoints_getContextEvent_Request_Soap"/>
        <variable name="TargetResponse"
element="ns2:EstablishTargetEndpoints_getContextEvent_Response_Soap"/>
        <variable name="ConstraintsRequest"
element="ns2:ConsiderConstraints_getContextEvent_Request_Soap"/>
        <variable name="OutRequest"
element="ns4:ConsiderSendOfSms_onSafOutEvent_Request_Soap"/>
        <variable name="ResultRequest"
element="ns2:RecordConnectResults_getResultEvent_Request_Soap"/>
        <variable name="ResultResponse"
element="ns2:RecordConnectResults_getResultEvent_Response_Soap"/>
    </variables>
    <sequence name="main">
        <receive createInstance="yes" name="Receive_Context_Event"
            partnerLink="OutInteractionSequence"
            portType="ns7:D_BPEL_PT"
            operation="onSafContextEvent"
            variable="ContextEventMessage"/>
        <invoke name="EstablishEndpoints"
            partnerLink="method-EstablishEndpointsService-com.bt
    .serviceAssemblyFramework.components.EstablishTargetEndpoints"
            portType="ns2:EstablishTargetEndpoints"
            operation="getContextEvent"
            inputVariable="TargetRequest"
            outputVariable="TargetResponse"/>
        <assign name="copy_3">
            <copy>
                <from variable="TargetResponse"
                    part="parameters"
query="/ns2:getContextEventResponse/ns2:result"/>
                <to variable="ConstraintsRequest"
                    part="parameters"
                    query="/ns2:getContextEvent/ns2:p0"/>
            </copy>
        </assign>
        <invoke name="ConsiderConstraints"
            partnerLink="method-ConsiderConstraintsService-com.bt
                .serviceAssemblyFramework.components.ConsiderConstraints"
            portType="ns2:ConsiderConstraints"
            operation="getContextEvent"
            inputVariable="ConstraintsRequest"
            outputVariable="ContextResponse"/>
        <assign name="copy_4">
            <copy>
                <from variable="ContextResponse"
                    part="parameters"
query="/ns1:getContextEventResponse/ns1:result/ns5:context"/>
                <to variable="OutRequest"
                    part="parameters"
query="/ns4:onSafOutEvent/ns4:p0/ns5:context"/>
            </copy>
        </assign>
        <invoke name="Invoke_OutEvent"
            partnerLink="SendSmsService"
            portType="ns4:ConsiderSendOfSmsSoofServlet"
            operation="onSafOutEvent"
            inputVariable="OutRequest"/>
        <receive createInstance="no" name="Receive_ResultEvent"
            partnerLink="SendSmsService"
            portType="ns4:SendSms_BPEL_PT"
            operation="onSafResultEvent"
            variable="ResultResponse"/>
        <assign name="copy_5">
            <copy>
```

| BPEL source for "Out to Msg CC Interaction" |
|---|
| ```
                <from variable="ResultResponse"
                      part="parameters"
  query="/ns2:getResultEventResponse/ns2:result"/>
                <to variable="ResultRequest"
                      part="parameters"
                      query="/ns2:getResultEvent/ns2:p0"/>
            </copy>
        </assign>
        <invoke name="RecordResults"
            partnerLink="method-RecordConnectResultsService-com.bt
                .serviceAssemblyFramework.components.RecordConnectResults"
            portType="ns2:RecordConnectResults"
            operation="getResultEvent"
            inputVariable="ResultRequest"
            outputVariable="ResultResponse"/>
        <reply name="Reply__To__InteractionSequenceService"
            partnerLink="OutInteractionSequence"
            portType="ns0:D__BPEL__PT"
            operation="onSafContextEvent"
            variable="ResultResponse"/>
    </sequence>
</process>
``` |

6. Next, the target endpoint(s) are established inside of Establish Out SMS Target SBB 1105. In this example, it is a simple mapping from the original SIP MESSAGE request to the target endpoints map.

| Setting a target endpoint |
|---|
| ```
    CxfContext context = contextEvent.getContext( );
    // the original SIP MESSAGE request data structure
    CxfRequestData requestData = context.getRequestData( );
    String targetUri = requestData.getTo( );
    // map the original target
    context.addTargetEndpoint(targetUri, targetUri);
``` |

7. Next, is the call to Consider Constraints Interaction behavior implementation for Out to Msg CC Interaction 1104. This component is called Consider Out SMS Constraints 1106.
8. Consider Out SMS Constraints SBB 1106 then calls constraint implementing components (POJOs). The calls are very simple:

| Example constraint test implementation POJO calls |
|---|
| ```
    contextEvent = BarringConstraint.execute(contextEvent);
    contextEvent = CreditConstraint.execute(contextEvent);
    contextEvent = eWalletConstraint.execute(contextEvent);
``` |

Internally, these POJOs perform the mechanics of interfacing with network level services for barring, credit test, and eWallet functions represented as common capabilities 1107, 1108, 1109. If any constraint applies, it is recorded as follows:

| Setting a constraint |
|---|
| ```
    contextEvent.addConstraint(BarringConstraint.getId( ),
    "TargetUri: " + targetUri + " is barred");
``` |

9. Next, is the async call to Out to Msg CC Interaction 1104 Consider Connect implementing SBB: Consider Send Request 1110. The BPEL call (from the "Out to Msg CC Interaction" listing above) is repeated next. Notice that it only has an inputVariable and not an outputVariable in the call. This is the BPEL way of indicating an asynch call.

| "Out to Msg CC Interaction" call to its Connect behavior |
|---|
| ```
    <invoke name="Invoke__OutEvent"
        partnerLink="SendSmsService"
        portType="ns4:ConsiderSendOfSmsSoofServlet"
        operation="onSafOutEvent"
        inputVariable="OutRequest"/>
``` |

10. There follows the call to the Messaging Facility, represented by Messaging common capability 1111.
11. In the asynch callback with a newly instantiated ResultEvent, a constructor (a method to create a new object instance) to the ResultEvent takes the context as a parameter.
12. This is followed by the call to record results implementing SBB 1112
13. The calls to the POJOs for Logging and eWallet Commit execute in a similar way to the calls to constraints POJOs.

There then follows:
14. The asynch callback to the SMS Out Interaction Sequence 1102;
15. The asynch callback to the relaying Field Request SBB 1101; and
16. The relay down to the UAS NAC 1100.
17. Field Request UAS NAC 1100 next composes and sends an appropriate SIP response back to the VOIP client. The response status is 200 OK if no constraints are found in the CxfContext. Otherwise the status is taken from the CxfContext with the warning header sourced from the constraints map.

SMS in Design

Figure 12:
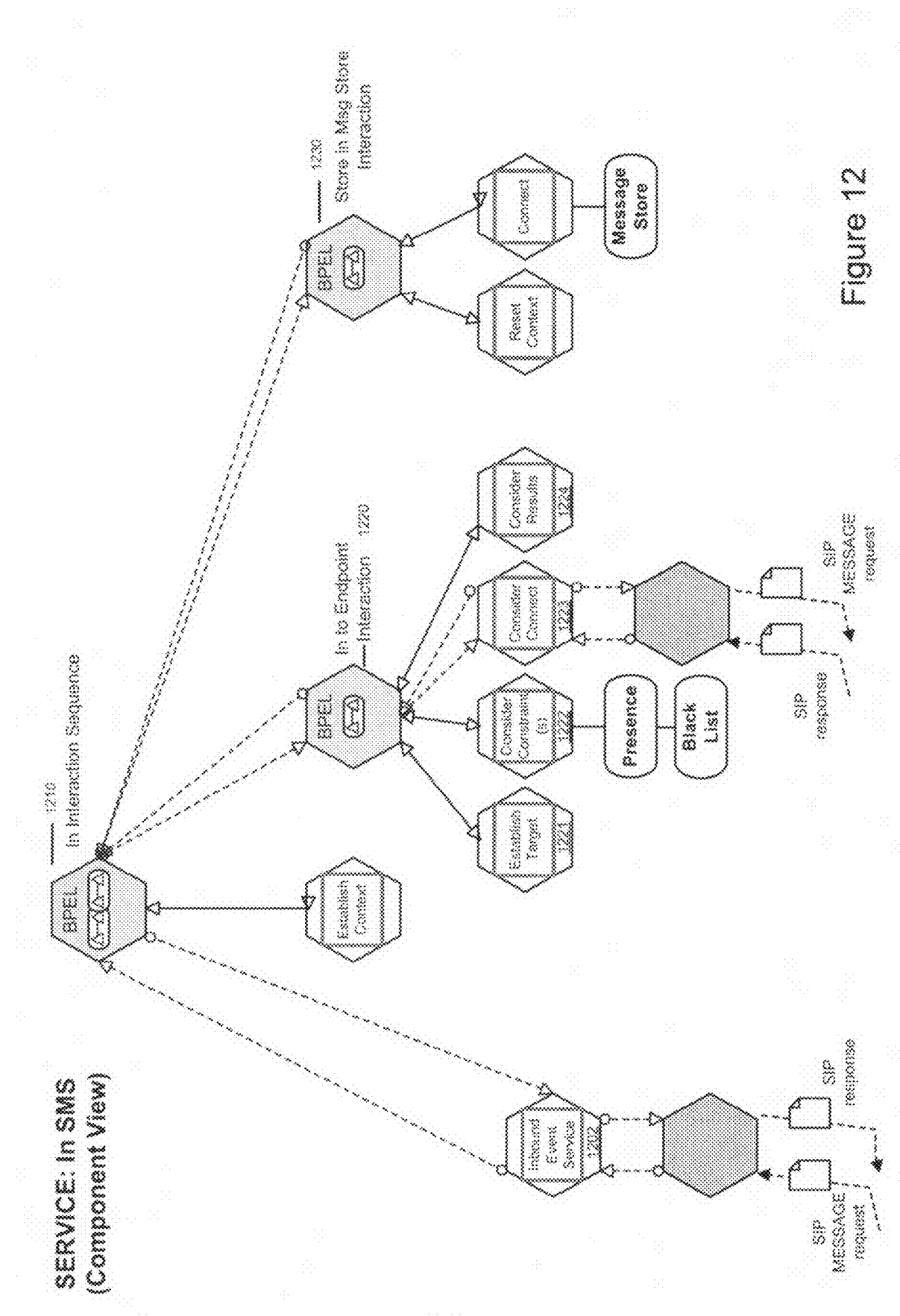

FIG. 12 shows the whole SMS In process in more detail, using CXDN notation. Referring back to the description of FIG. 7, the reader will appreciate that operation of SMS In is initiated with the receipt of a SIP MESSAGE request from an endpoint (e.g. GSM phone 79) outside of the local network; the content of which forms the basis for the CxfContent data forming part of a new ConnectEvent. The SIP MESSAGE request is received through messaging facility 77 which, if VoIP client 71 is present, proxies it. If VoIP client 71 is not present, SMS In stores the received message in the Message Store 74 with storage being implemented through the second interaction in FIG. 12: StoreInMsgStore Interaction 1230.

The SMS In process will not be described in detail here but the reader will appreciate, that the fundamentals of operation are common with the SMS Out process, described above. In particular, In SMS Interaction Sequence 1210 receives a ConnectEvent from InBoundEvent Interaction Behavior 1202 and passes it to IntoEndpoint Interaction 1220. IntoEndpoint Interaction 1220 is a synchronous interaction, as illustrated in FIG. 2b, with the set of standard Interaction behaviors described previously.

The operation of In SMS, will now be briefly described. Establish_end_point Interaction Behavior 1221 populates targetEndpoints with URIs from the ConnectEvent; Consider_constraints Interaction Behavior 1222 examines the targetEndpoints and determines whether a connect attempt should be made or not and records why in connectConstraints; Synch_connect Interaction Behavior 1223 synchronously triggers a connect attempt to the URIs listed in targetEndpoint(s) (this action is bypassed if any connectConstraints are present in CxfContext); and Return_result Interaction Behavior 1224 calls back to IntoEndpoint Interaction 1220 which calls back to In SMS Interaction Sequence 1210. if the result indicates that VoIP client 71 is of-line, SMS Interaction Sequence 1210 calls StoreInMsgStore Interaction 1230, which stores the received message with message store 74 and returns control to SMS Interaction Sequence 1210.

SMS Notify Design

Figure 13:
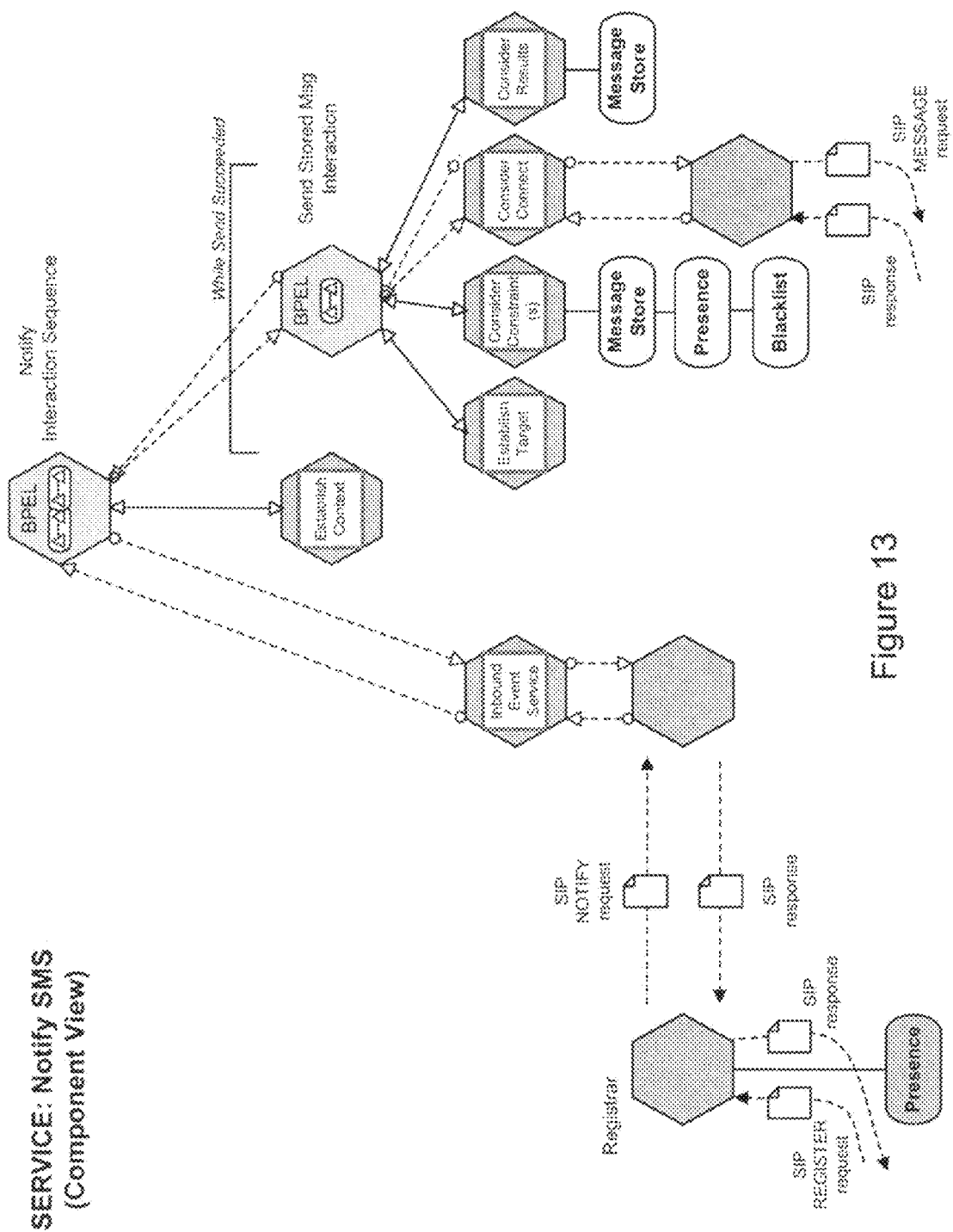

FIG. 13 shows the whole SMS Notify process in more detail, using CXDN notation. The SMS Notify process will not be described in detail here but the reader will appreciate that, as with the SMS In process, the fundamentals of operation of SMS Notify are common with the SMS Out process, described above. Referring back to the description of FIG. 8, the reader will appreciate that operation of SMS Notify is triggered by registrar 82 when VoIP client 81 comes (back) online. SMS Notify reacts by sending any messages stored at message store 84 to VoIP client 81. As noted above, the single Interaction of SMS Notify Interaction Sequence may loop, as indicated by the bracket "while send succeeded" to clear more than one message from the store.

SAA may be viewed as a tool which facilitates the creation of new combinations and permutations of stock software objects, these stock software objects being elements of control and configuration for services in a communications system The "services" so defined are the resulting output of the tool in the form of larger custom-designed software objects that can then be moved into an operative condition in the working system (HW and SW) of an existing communications services platform.

The "output" of the tool is a new package of software which, when executed on a suitable platform, will result in defining and providing the desired new communication services(s).

Those skilled in the art will appreciate that the above embodiments of the invention are simplified. Those skilled in the art will moreover recognise that several equivalents to the features described in each embodiment exist, and that it is possible to incorporate features of one embodiment into other embodiments. Where known equivalents exist to the functional elements of the embodiments, these are considered to be implicitly disclosed herein, unless specifically disclaimed. Accordingly, the spirit and scope of the invention is not to be confined to the specific elements recited in the description but instead is to be determined by the scope of the claims, when construed in the context of the description, bearing in mind the common general knowledge of those skilled in the art.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

Moreover, for the avoidance of doubt, where reference has been given to an earlier document, whose contents, whether as a whole or in part thereof, are necessary for the understanding of the operation or implementation of any of the embodiments of the present invention by the intended reader, being a man skilled in the art, then said contents should be taken as being incorporated herein by said reference thereto.

What is claimed is:

1. A re-usable method component of a process control flow including:
    (a) receiving from a source device a request comprising one or more parameters for communications process control;
    (b) identifying constraints relating to the communications process and comparing the parameters received with the request with the constraints;
    (c) checking for a result from the comparison of step (b) and attempting to set up a connection to an end point identified by one or more of the parameters, if the result is positive;
    (d) waiting for the result of the connection attempt in step (c);
    (e) upon receiving the result of the connection attempt, assessing the result;
    (f) notifying the source device of the request of the outcome of the communications process control flow; and
    (g) provisioning a data structure, in which the data structure is processed in each step (a) to (f), wherein the data structure comprises
        i. a request field for the request from a user for a communications service;
        ii. a service identity field for the identity of the communications service;
        iii. a user identity field for the identity of the user;
        iv. an end points identity field for the identities of the end points of the process control flow component;
        v. an active constraints field;
        vi. a results field for the result of the requested service control flow,
        vii. a response status field;
        viii. a response field for the response to the service request; and
        ix. an output field for an output provided by one or both endpoints.

2. A re-usable component as claimed in claim 1 in which each of the steps (a) to (f) is called and passed a data structure, in sequence, by a higher-level process, in which each of the steps updates the data structure, as appropriate and passes control and the data structure back to the higher-level process on completion.

3. A re-usable component as claimed in claim 1 in which between one and three of the steps (a) to (f) are stubs, in which each stub only acts to pass control and a data structure back to the higher-level process.

4. A re-usable component as claimed in claim 1 in which each of the steps (a) to (f) is implemented as a network service element.

5. A re-usable component as claimed in claim 1 in which the one or more parameters comprise at least one of a logical identifier and a logical address.

6. A re-usable component as claimed in claim 1 in which the data structure is a Cxf Context data structure.

7. A re-usable component as claimed in claim 1 in which the constraints comprise at least one of financial, presence, security and physical constraints.

8. A re-usable component as claimed in claim 1 in which each method step interfaces to each adjacent method step by means of Web Services Description Language (WSDL).

9. A re-usable component as claimed in claim 1 in which constraints are defined and processed independent of the service control flow.

10. A re-usable component as claimed in claim 1 in which the request comprises a SIP invite.

11. A re-usable component as claimed in claim 1 in which the identity of the user comprises a SIP URI.

12. A re-usable component as claimed in claim 1 including employing a business process management language to control the flow.

13. A re-usable component as claimed in claim 1 including employing reusable service flow elements of various granularities to construct a service.

* * * * *